United States Patent [19]

Takahashi

[11] Patent Number: 5,689,812
[45] Date of Patent: Nov. 18, 1997

[54] RADIO PROPAGATION SIMULATION METHOD

[75] Inventor: Satoshi Takahashi, Yokohama, Japan

[73] Assignee: Hitachi, Ltd., Tokyo, Japan

[21] Appl. No.: 493,319

[22] Filed: Jun. 21, 1995

[30] Foreign Application Priority Data

Jun. 21, 1994 [JP] Japan ............................... 6-138522

[51] Int. Cl.$^6$ ................................................. H04B 17/02
[52] U.S. Cl. ...................... 455/67.6; 455/52.1; 342/360; 364/514 B
[58] Field of Search ..................... 455/52.1, 56.1, 455/53.1, 67.1, 67.2, 67.6, 67.4; 364/550, 514 R, 514 B, 578; 342/359, 360

[56] References Cited

U.S. PATENT DOCUMENTS

| | | | |
|---|---|---|---|
| 4,941,207 | 7/1990 | Maeda et al. | 455/41 |
| 5,301,127 | 4/1994 | Hitney | 364/525 |
| 5,450,615 | 9/1995 | Fortune et al. | 455/67.6 |
| 5,491,644 | 2/1996 | Pickering et al. | 364/514 R |
| 5,574,466 | 11/1996 | Reed et al. | 342/359 |

OTHER PUBLICATIONS

John McKown et al, Ray Tracing as a Design Tool for Radio Networks. Nov. 1991 pp. 27–30. (IEEE).

Youssef, Radar Cross Section of Complex Targets, IEEE, May 89, vol. 77, pp. 722–734.

Ikeami et al, Theoretical Prediction of Mean Field Strength for Urban Mobile Radio, IEEE, vol. 39 pp. 299–301.

Walfisch et al, A Theoretical Model of UHF Propagation in Urban Environments (IEEE), Dec. 1988, vol. 36.

Rustako et al., Radio Propagation at Microwave Frequencies for Line of Sight Microcellular Mobile and Personal Communication, IEEE, Feb. 1991, vol. 40, pp. 203–210.

*Primary Examiner*—Reinhard J. Eisenzopf
*Assistant Examiner*—Lee Nguyen
*Attorney, Agent, or Firm*—Antonelli, Terry, Stout & Kraus, LLP.

[57] ABSTRACT

For electric waves emitted from a base station, an arrival area of reflection waves thereof is determined according to a reflection object by which the electric waves are last reflected and a fictitious transmitting point decided for the reflection object. Received power of reflection waves is calculated for each evaluation point in the particular area. Since the calculation is conducted for the limited area, the period of time required for the calculation is remarkably minimized while retaining the precision of calculation when compared with the case in which the calculation is achieved for all related areas.

12 Claims, 17 Drawing Sheets

| AMPLITUDE (1,1) | AMPLITUDE (1,2) | • • • • • • | AMPLITUDE (1,n) |
|---|---|---|---|
| AMPLITUDE (2,1) | AMPLITUDE (2,2) | • • • • • • | AMPLITUDE (2,n) |
| • • • • • • | • • • • • • | • • • • • • | • • • • • • |
| AMPLITUDE (m,1) | AMPLITUDE (m,2) | • • • • • • | AMPLITUDE (m,n) |

FIG.16A
FIG.16B
FIG.16C
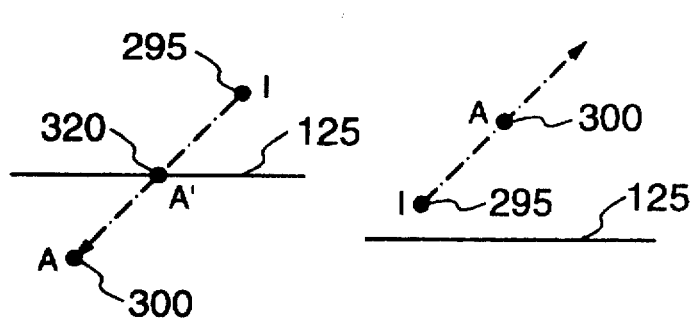
FIG.17A
FIG.17B
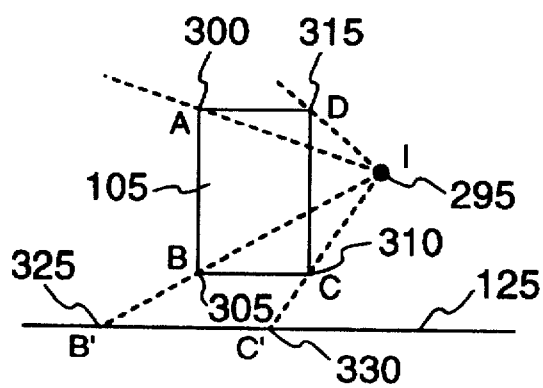
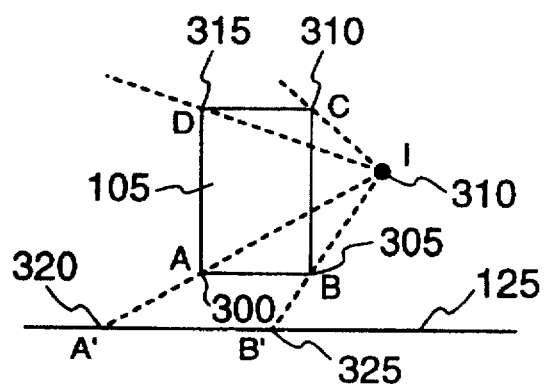
FIG.18
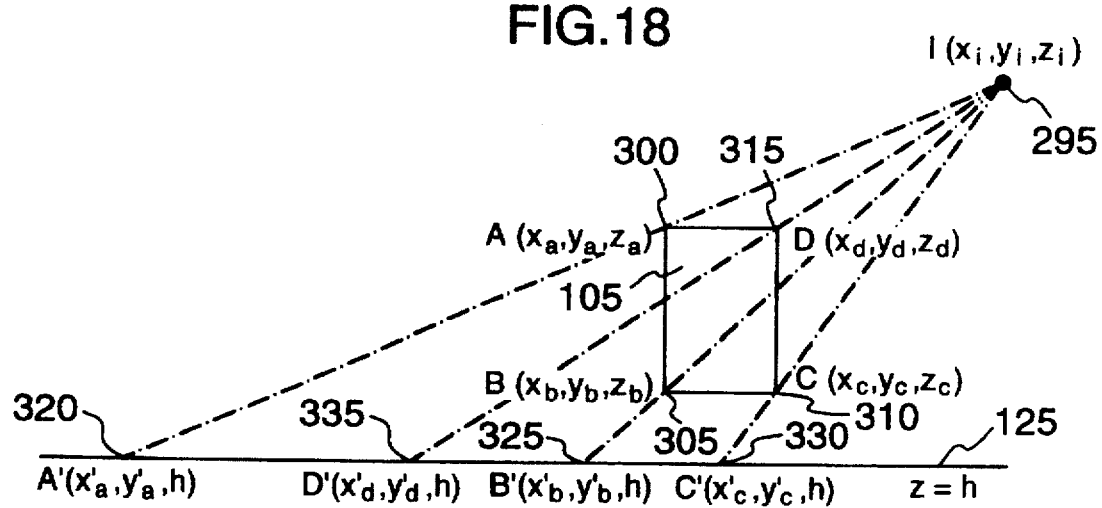

RADIO PROPAGATION SIMULATION METHOD

BACKGROUND OF THE INVENTION

1. Field of the Invention

The present invention relates to a radio propagation simulation method and, in particular, to a method of predicting electric field intensity for placement and zone design of base stations in a mobile communication system.

2. Description of the Related Art

In a mobile communication system including a plurality of base stations and a plurality of portable stations, it is essential to estimate electric field intensity in the system utilization area. For example, the system is required to be designed such that electric waves from base stations fully reach portable stations related thereto in respective utilization ranges presumed for the respective portable stations. However, when the placement design is inappropriate and the number of base stations installed therein is increased, the overall cost of the system is naturally soared. Moreover, when a portable station is communicating with a base station, there arises a problem that interference of base stations other than the communicating base station is increased and hence a particular range of frequencies cannot be used for communication. Conversely, when the number of base stations is excessively decreased, there appear some areas which cannot receive electric waves with a sufficient field intensity from the base stations, leading to a problem that the portable stations cannot be operated in such areas.

If the electric field intensity can be appropriately predicted, it is possible to achieve the placement design of base stations such that the overall regions where portable stations are presumably used can be covered by an optimally reduced number of base stations. For example, in primary areas where a large number of users operate their portable stations, there are installed many base stations to provide a stable intensity of electric field; whereas, in other areas where portable stations are less frequently used, the number of base stations are relatively reduced, thereby conducting an optimal system installation depending on situations.

A method of predicting electric field intensity in a mobile communication system has been described, for example, in pages 27 to 30 of the "IEEE Network Magazine", November 1991.

According to the conventional method, for example, as shown in FIG. 2, parameters are set and storage areas are initialized for all evaluation points (step 155) and then one of the evaluation points is chosen on an evaluation plane (step 160) to decide one possible path between a transmitting point and the evaluation point (step 165) so as to judge to determine whether or not the path is actually available therebetween (step 170). If the path is present, the value of amplitude is calculated for the path in consideration of reflection and penetration of the path (step 175) and then the obtained value of amplitude is added to a value beforehand stored in a storage area corresponding to the evaluation point (step 180). The steps of path decision (step 165), path existence judgement (step 170), path amplitude calculation (step 175), and addition of amplitude value (step 180) are repeatedly executed for all possible paths (step 185). These steps are iteratively accomplished for all evaluation points (step 190). When the calculation is completed for all evaluation points, an intensity distribution is displayed (step 195).

In case where reflection objects are present in the neighborhood of the transmitting or evaluation point, not only electric waves directly received from the transmitting point but also reflection electric waves reflected by the objects are required to be taken into consideration when forecasting the electric field intensity at the evaluation point. For example, assume that there exist two reflection objects in the proximity thereof and electric waves reflected by the objects through up to second-order reflection are to be considered. In the decision of paths between the transmitting and evaluation points (step 165), there are obtained five paths as "transmitting point—evaluation point", "transmitting point—reflection object 1—evaluation point", "transmitting point—reflection object 2—evaluation point", "transmitting point—reflection object 1—reflection object 2—evaluation point", and "transmitting point—reflection object 2—reflection object 1—evaluation point".

Assume the number of reflection objects and the maximum reflection order to be w and n, respectively. The number p of paths is expressed as follows.

$$p = 1 + w + w(w-1) + w(w-1)^2 + w(w-1)^{n-1} \qquad (1)$$
$$= 1 + \sum_{i=1}^{n} (w-1)^{i-1}$$

The decision of the path from the transmitting point to the evaluation point (step 170) will be described in detail with reference to FIG. 3.

FIG. 3 shows a method of deciding a path of electric wave 135 of reflection waves associated with the electric waves illuminated from a transmitting point 100. Specifically, the electric waves are reflected at a reflection point 110 of a first reflection object 105 and reflection electric waves are then reflected again at a reflection point 120 of a second reflection object 115. Through the path 135, the resultant electric waves arrive at the evaluation point 130.

First, an imaging or virtual transmitting point 140 is set to a position having the property of point symmetry for the virtual transmitting point 140 about the first reflection object 105. Additionally, there is determined an imaginary or fictitious transmitting point 145 at a position having the property of point symmetry for the imaginary transmitting point 140 about the second reflection object 115. In this situation, the distance between the evaluation point 130 and the fictitious transmission point 145 is substantially equal to the propagation distance of electric waves between the transmitting point 100 and the evaluation point 130. According to this relationship, the (propagation) loss of the electric waves due to propagation thereof through the path from the evaluation point 130 to the fictitious transmitting point 145 is calculated to be kept in the system.

Subsequently, there is determined a point of intersection between the second reflection object 151 and a straight line between the evaluation point 130 and the imaginary transmission point 145. The intersection point is set as a reflection point 120 on the object 151. If the point 120 is missing on the object 151, it is assumed that the path of the reflection waves is absent and hence control is passed to the calculation of the next path. If the reflection point 120 exists on the second reflection object 115, the reflection loss is calculated on the basis of electrical parameters of the object 115 an is then added to the propagation loss stored in advance. A check is then made to decide whether or not any other object is present between the evaluation point 130 and the reflection point 120 on the object 115.

If such an object is existing, the penetration loss is calculated according to electrical parameters of the object to be added to the accumulated value thereof. In addition, there is determined a crosspoint between the first reflection object 105 and a straight line between the reflection point 120 on the second reflection object 115 and the imaging transmission point 140. The intersection point is set as a reflection point 110 on the first reflection object 115. If the point 110 is absent on the object 115, it is assumed that the path of the reflection wave is absent and hence there is accomplished the calculation for the next path. If the reflection point 110 is detected on the first reflection object 105, the reflection loss is calculated according to electrical parameters of the object 115 and is then added to the propagation loss accumulated in advance. A judging step is then carried out to determine whether or not any other object exists between the reflection point 120 of the second reflection object 115 and the reflection point 110 of the first reflection object 105.

If the object is present, the penetration loss is calculated on the basis of electrical parameters of the object to be added to the accumulated value thereof. A check is then conducted to decide whether or not any other object is present between the transmission point 100 and the reflection point 110 on the first reflection object 105. If this is the case, the penetration loss is calculated using electrical parameters of the object and is then added to the value thereof beforehand obtained. In this fashion, intensity of each reflection wave is obtained for each path. The intensity values thus obtained for the respective paths are then added to each other to resultantly determine received power (amplitude of received electric waves) or electric field intensity at the evaluation point 130.

By repeatedly accomplishing the above calculation for each evaluation point, there is decided the electric field intensity in the pertinent zone.

Actually, however, the indoor environment in which the mobile communication system is installed includes a large number of reflection objects and a multiplicity of combinations of reflections. This remarkably increases the number of reflection wave paths to be checked. Assume, for example, the number of reflection objects is 60 and the reflection waves up to second-order reflection waves arrive at each evaluation point. Under this condition the number of path to be judged for each evaluation point is derived as 3601 from expression (1). Consequently, when the system includes 10,000 evaluation points, the check is required to be effected for 36,010,000 paths in total. Namely, a considerably long period of time is necessary for the decision of paths and determination of crosspoints associated with the respective reflection objects, and hence a considerably long period of time is required for the radio propagation simulation in the zone.

On the other hand, according to investigation on path existence probability in practical indoor environments, it has been known that only about 1% of reflection waves including up to second-order reflection waves reach evaluation points. According to the conventional methods, although a group of evaluation points at which reflection waves reflected from reflection objects arrive can be intuitively determined to a certain extent, the path existence check is carried out also for the remaining paths (about 99% of the overall paths) not receiving reflection waves, thereby disadvantageously consuming a long period of time for inefficient calculations.

Description has been given of the operation for reflection waves, which however also applies to calculation of direct electric waves. Namely, according to the prior art, for the evaluation points which can receive obviously direct electric waves from the transmission point without any obstruction, there is consumed a long period of time for ineffective calculations to decide existence of intersection points between each of the reflection objects and each of the straight lines between the evaluation and transmission points.

SUMMARY OF THE INVENTION

It is therefore an object of the present invention to provide a radio propagation simulation method capable of achieving calculations for path decision in a shorter period of time.

In order to achieve the object according to the present invention, on the basis of positional relationships between a transmission point or an imaging reflection point related to a reflection object having last reflected the reflection waves and reflection objects, there is beforehand decided a particular area in which reflection waves possibly exist. The path existence check is then conducted only for the evaluation points in the particular area.

Moreover, according to the present invention, on the basis of coordinate or positional relationships between the transmission points and reflection objects, there is beforehand determined a particular area in which penetration waves possibly have a chance to be present such that the check of penetration wave path is accomplished only for the evaluation points in the particular area.

According to the present invention, a particular area in which reflection or penetration waves possibly exist is decided in advance to carry out the check of reflection or penetration wave path only for the evaluation points in the particular area so as to execute calculations for intensity of reflection or penetration waves reaching the evaluation points. In consequently, the period of time necessary for the calculation is remarkably minimized when compared with the method in which the path judgement is conducted for all evaluation points.

BRIEF DESCRIPTION OF THE DRAWINGS

The foregoing and other objects, advantages, manner of operation, and novel features of the present invention will be understood from the following detailed description when read in connection with the accompanying drawings wherein:

FIGS. 16A to 16C are diagrams showing coordinate relationships between a transmitting point or a fictitious transmitting point, a vertex of a reflection object, and an irradiation point of an evaluation plane;

FIGS. 17A and 17B are diagrams showing examples having mutually different state variables and the same existence area of reflection or penetration waves;

FIG. 18 is a diagram showing relationships of coordinates between a transmitting point or a fictitious transmitting point, reflection objects, and evaluation planes;

DESCRIPTION OF THE PREFERRED EMBODIMENTS

Figure 4:
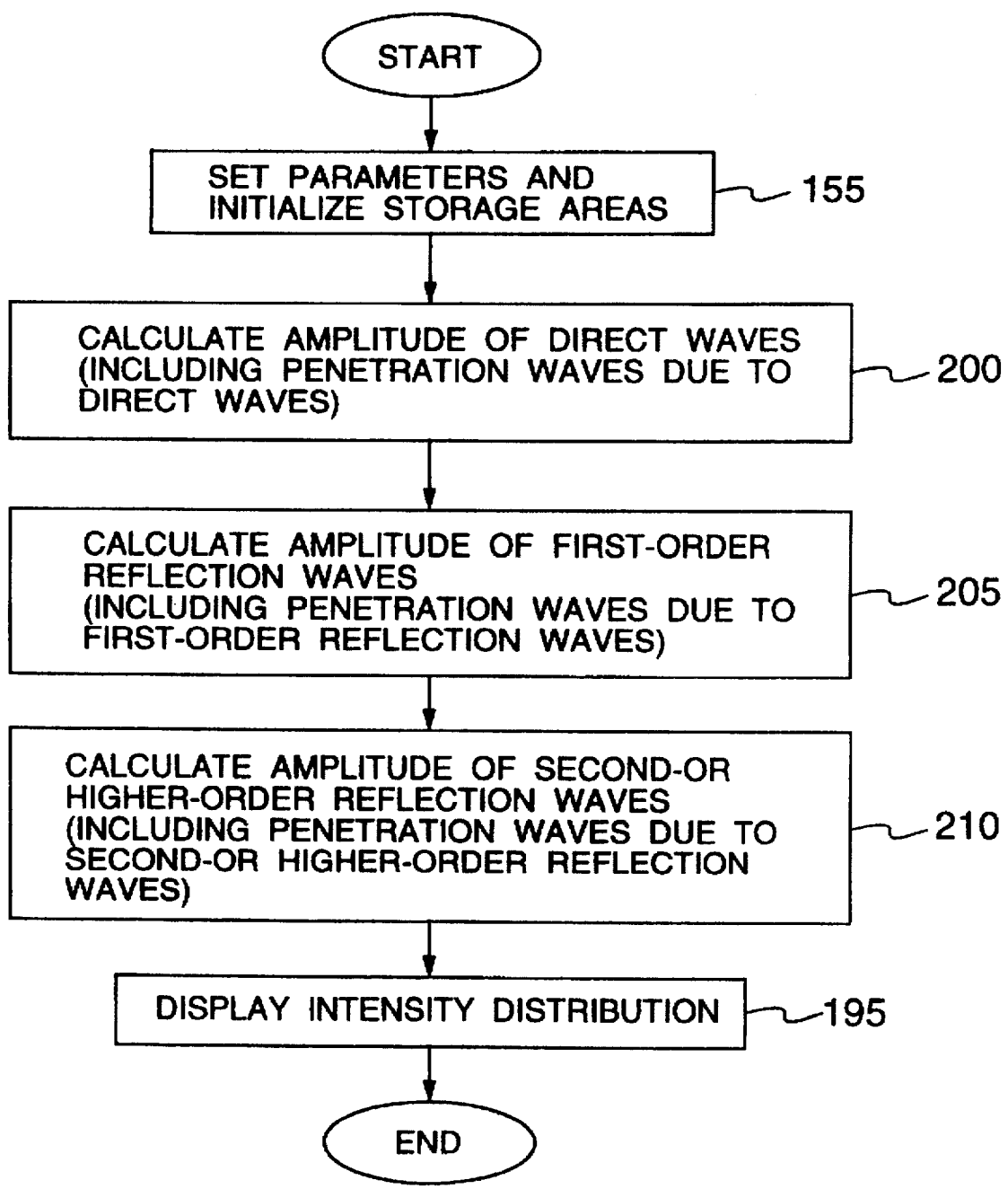
FIG. 4 is a flowchart showing an embodiment of a method of forecasting the received power according to the present invention.

FIG. 4 is a flowchart showing an embodiment of the radio propagation simulation method according to the present invention.

First, calculation parameters are set and storage areas to keep therein amplitude values of all evaluation points are initialized (step 155). For each evaluation point, amplitude is calculated for direct waves (including penetration waves due to direct waves) from the base station to be kept in the storage area (step 200). Next, an area at which first-order reflection waves (including penetration waves due to first-order waves) arrive is determined such that amplitude (intensity) of the first-order reflection waves is calculated for each evaluation point in the determined area so as to add for each evaluation point the obtained value of amplitude (intensity) to that of direct waves beforehand calculated (step 205). Furthermore, an area at which second- and higher-order reflection waves (including penetration waves due to second- and higher-order waves) arrive is decided and then amplitude (intensity) of the reflection waves is calculated for each evaluation point in the decided area (step 210). For each evaluation point, the obtained value of amplitude (intensity) is added to that of reflection waves beforehand accumulated (coherent summation of amplitude). Finally, according to the results of calculation of power received at the respective evaluation points, a graphic image of distribution of intensity distribution or received power is generated to be presented, for example, on a display (step 195).

Subsequently, each of the steps above will be described in detail.

Figures 5, 6:
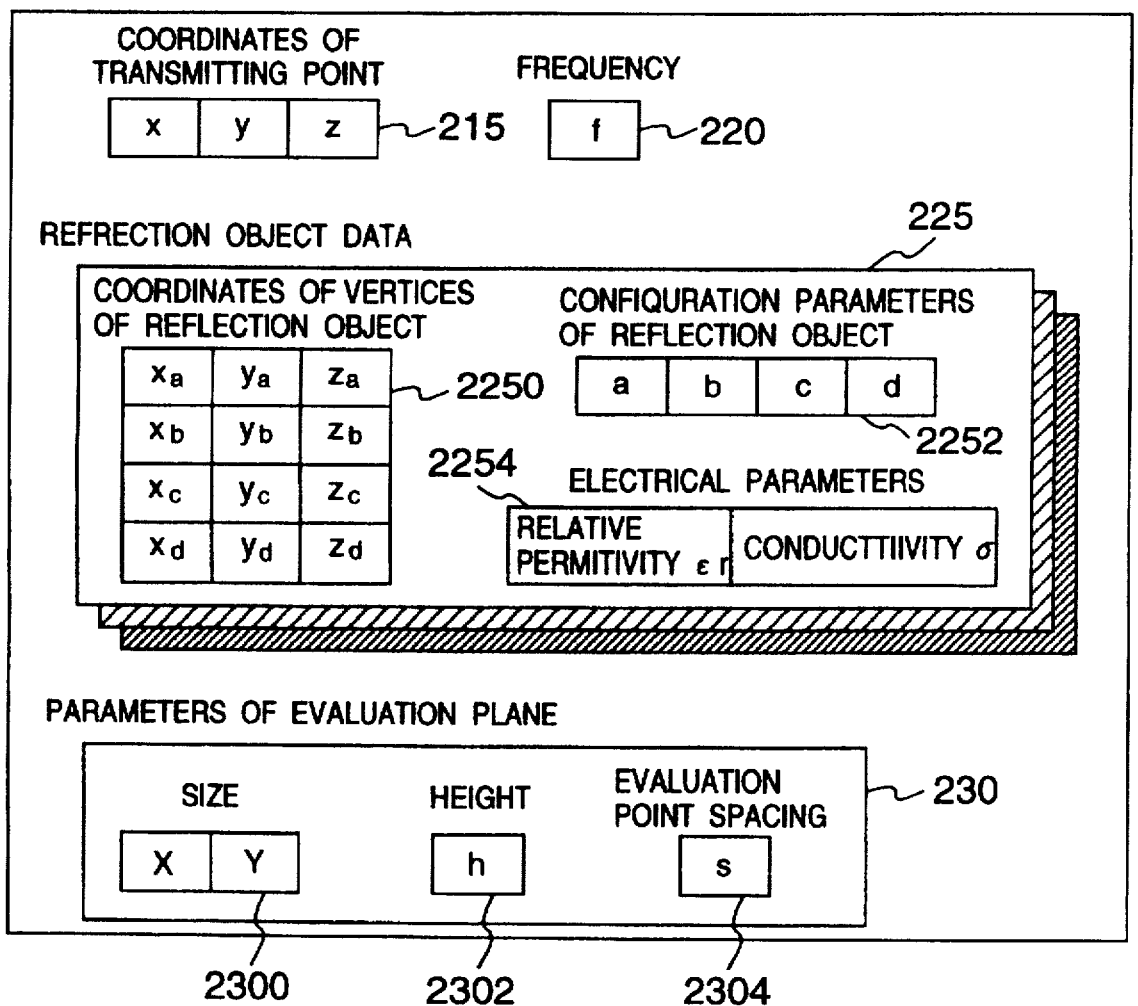
FIG. 5 is a diagram showing the configuration of parameters employed according to the present invention.
FIG. 6 is a diagram showing the layout of storage areas to store therein results of calculations.

FIG. 5 shows an example of parameters to be set and initialized in step 155, whereas FIG. 6 shows the layout of a storage area 235 keeping therein values of amplitude.

The parameters include coordinates (x,y,z) 215 of a transmitting point, namely, a position of transmission, a frequency f 220 to be used when calculating propagation, reflection, and penetration losses, reflection object data 225, and parameters 230 of the evaluation plane.

The evaluation plane parameters 230 include size (X,Y) 2300 of the plane, height h 2302 thereof, and evaluation point spacing s 2304.

The reflection object data 225 is kept in the storage area for each reflection object and includes coordinates 2250 of four vertices of a rectangle representing the reflection object, configuration parameters (a,b,c,d) 2252 of the plane to facilitate crosspoint calculation, and electrical parameters (relative permittivity $\epsilon_r$ and conductivity $\sigma$) 2254 to be utilized when calculating reflection and penetration losses.

Values of parameters a to d are substituted in the configuration parameters 2252 such that $ax+by+cz+d=0$ is satisfied at the four points determined when the coordinates 2250 thereof are given. Concretely, when three points are specified as $A(x_a,y_a,z_a)$, $B(x_b,y_b,z_b)$, and $C(x_c,y_c,z_c)$ in the coordinates 2250, the reflection object has a normal vector n(a,b,c) represented as a vector product between vector (A−B) and vector (c−B), which is represented by expression (2). In this connection, these variables are used when determining a imaging transmission point.

$$n = (A-B) \times (C-B) \quad (2)$$

$$= \begin{vmatrix} i & j & k \\ x_a - x_b & y_a - y_b & z_a - z_b \\ x_c - x_b & y_c - y_b & z_c - z_b \end{vmatrix}$$

$$= i\{(y_a - y_b)(z_c - z_b) - (y_c - y_b)(z_a - z_b)\} +$$

$$= j\{(z_a - z_b)(x_c - x_b) - (z_c - z_b)(x_a - x_b)\} +$$

$$= k\{(x_a - x_b)(y_c - y_b) - (x_c - x_b)(y_a - y_b)\}$$

$$ax_a + by_a + cz_a + d = 0$$

$$a = (y_a - y_b)(z_c - z_b) - (y_c - y_b)(z_a - z_b)$$

$$b = (z_a - z_b)(x_c - x_b) - (z_c - z_b)(x_a - x_b)$$

$$c = (x_a - x_b)(y_c - y_b) - (x_c - x_b)(y_a - y_b)$$

$$d = -ax_a - by_a - cz_a$$

Figure 7:
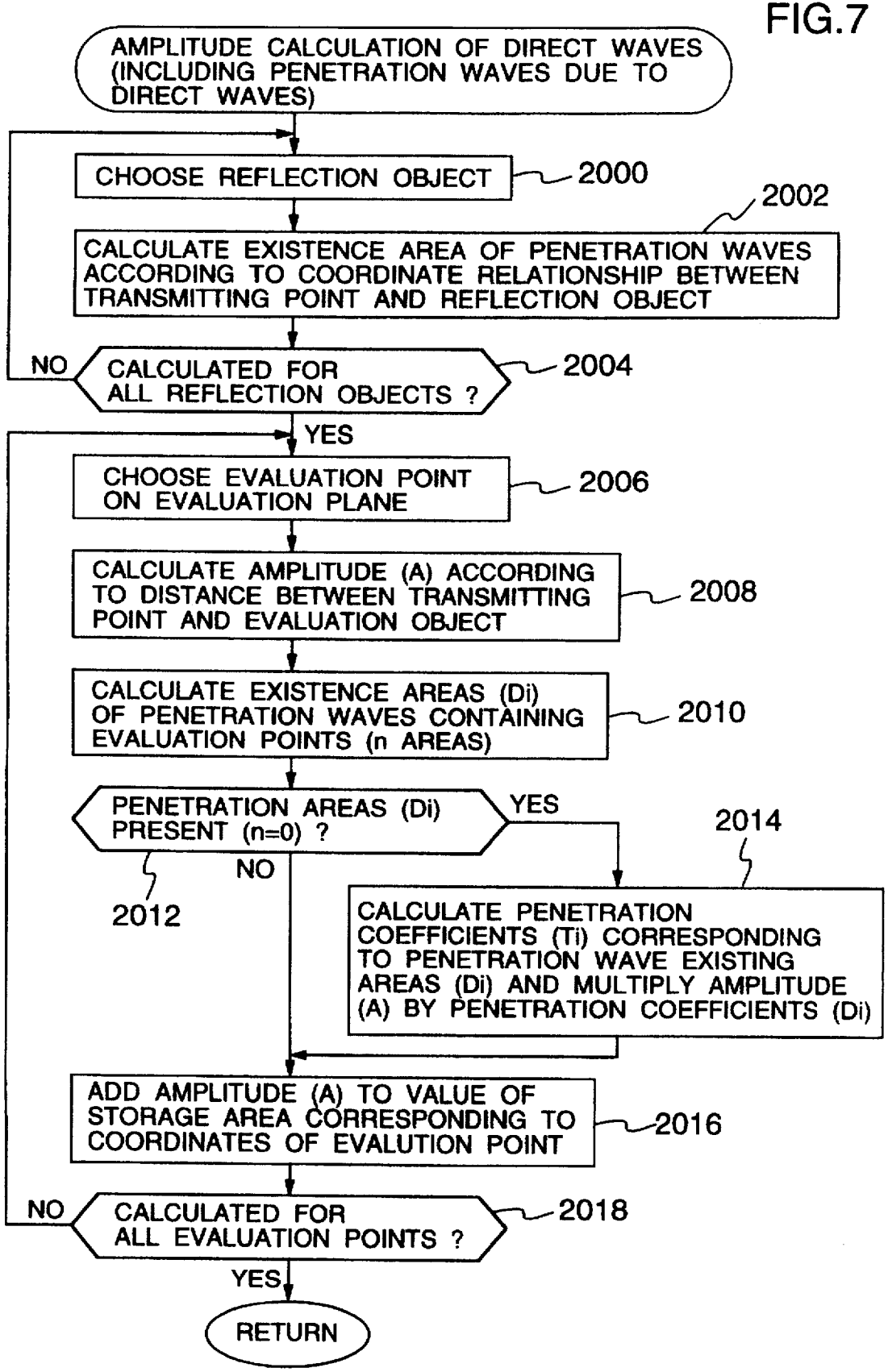
FIG. 7 is a flowchart showing a method of calculating intensity of direct waves according to the present invention.
Figure 8:
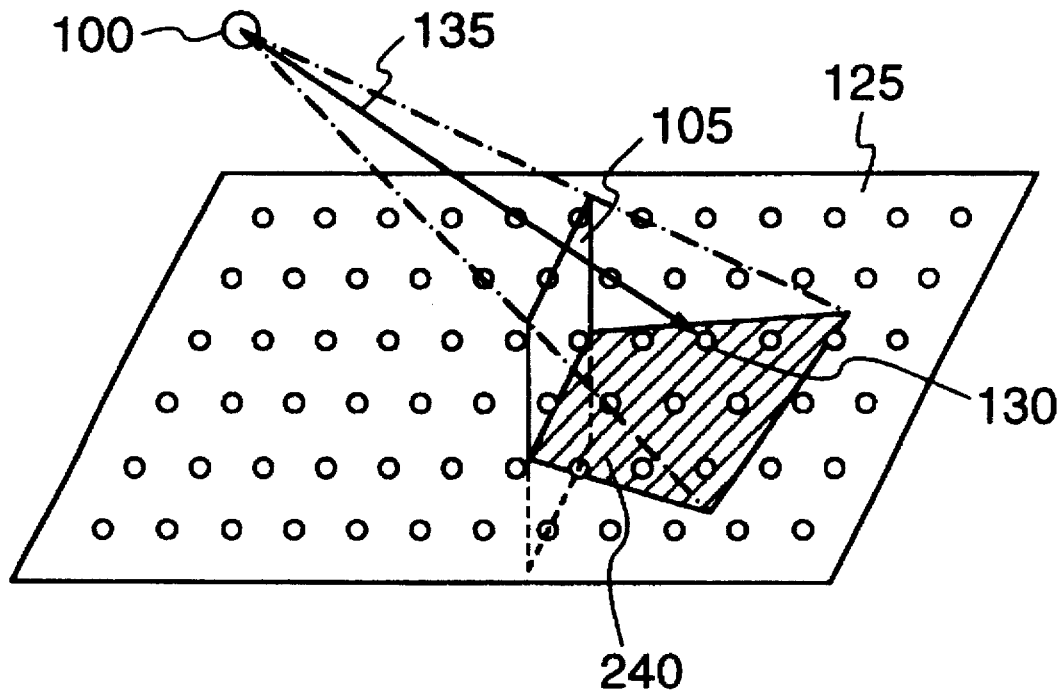
FIG. 8 is a perspective view showing an example of the objective area for the calculation of intensity of direct waves according to the present invention.
Figure 9:
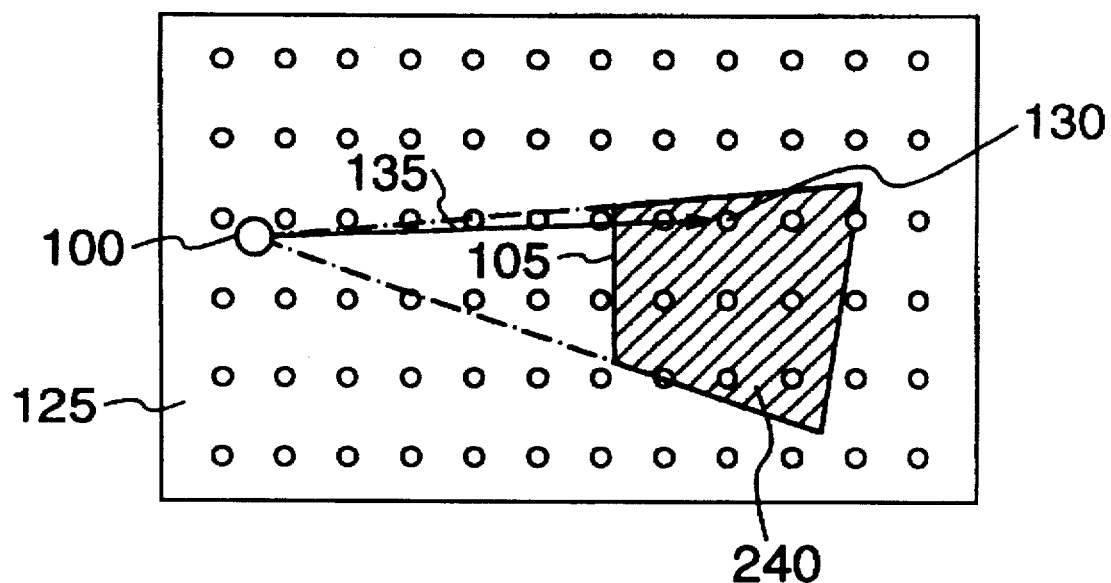
FIG. 9 is a plan view associated with the perspective view of FIG. 8.

FIG. 7 is a flowchart showing the amplitude calculation of direct waves and FIGS. 8 and 9 respectively are a perspective view and a plan view for explaining the calculation of direct waves according to the present invention.

In the amplitude calculation of direct waves, one reflection object is first chosen (step 2000) to conduct calculations for an existence area of penetration waves according to the relationship of coordinates between the transmitting point and the reflection object (step 2002). The operation above is repeatedly accomplished for all reflection objects (step 2004). Thereafter, one evaluation point is selected on a plane (to be referred to as evaluation plane herebelow) having a fixed height (step 2006) to obtain distance between the transmitting point and the evaluation point according to the coordinates thereof so as to conduct calculation of expression (3) to attain amplitude A of electric waves received in a free space corresponding to the distance (step 2008).

$$A = \frac{\lambda}{4\pi r} A_0 \qquad (3)$$

In expression (3), r stands for the distance from the transmitting point to the evaluation point, $A_0$ denotes the magnitude of amplitude at the transmitting point, and $\lambda$ designates the wavelength represented as $\lambda = c/f$, where f is the frequency (220) and c indicates the light speed ($c=3\times10^8$ m/s).

Subsequently, calculations are carried out for penetration wave existence areas in which the pertinent evaluation area exists (step 2010). Assume that the number of penetration wave existence areas in which the pertinent evaluation area exists is n. When the evaluation point is in either one of the existence areas (Di, i=1, 2, ..., n) of passages of penetration waves, namely, n≠0 (step 2012), the penetration coefficient Ti of the reflection object is calculated for the existence area of penetration waves such that the coefficient Ti is multiplied by amplitude A attained in advance (step 2014). The resultant amplitude A is added to the value of the storage area corresponding to the evaluation point (step 2016). The above operation is conducted for all evaluation points (step 2018).

Specifically, referring to FIGS. 8 and 9, a reflection object 105 is selected to calculate a penetration wave existence area 240 on the basis of the coordinate relationship between the transmission point 100 and the reflection object 105. This operation is repeatedly achieved for all reflection objects.

Next, each evaluation point 130 is sequentially chosen to determine amplitude A in the free space according to the distance between the transmitting point and the evaluating point. From the penetration wave existence areas calculated for all reflection objects, there is selected an area 240 containing the pertinent evaluation point 130. If the area 240 is present, namely, the direct waves are interrupted by the reflection object 105, the penetration coefficient Ti is calculated according to the electrical parameters 2254 of the reflection object 105 corresponding to the area 240. The coefficient Ti is multiplied by amplitude A beforehand obtained. For all evaluation points, there are repetitiously executed the steps in which an evaluation point is chosen and then an area containing the evaluation point is determined so as to multiply the penetration coefficient associated with the area by amplitude A.

Figure 10:
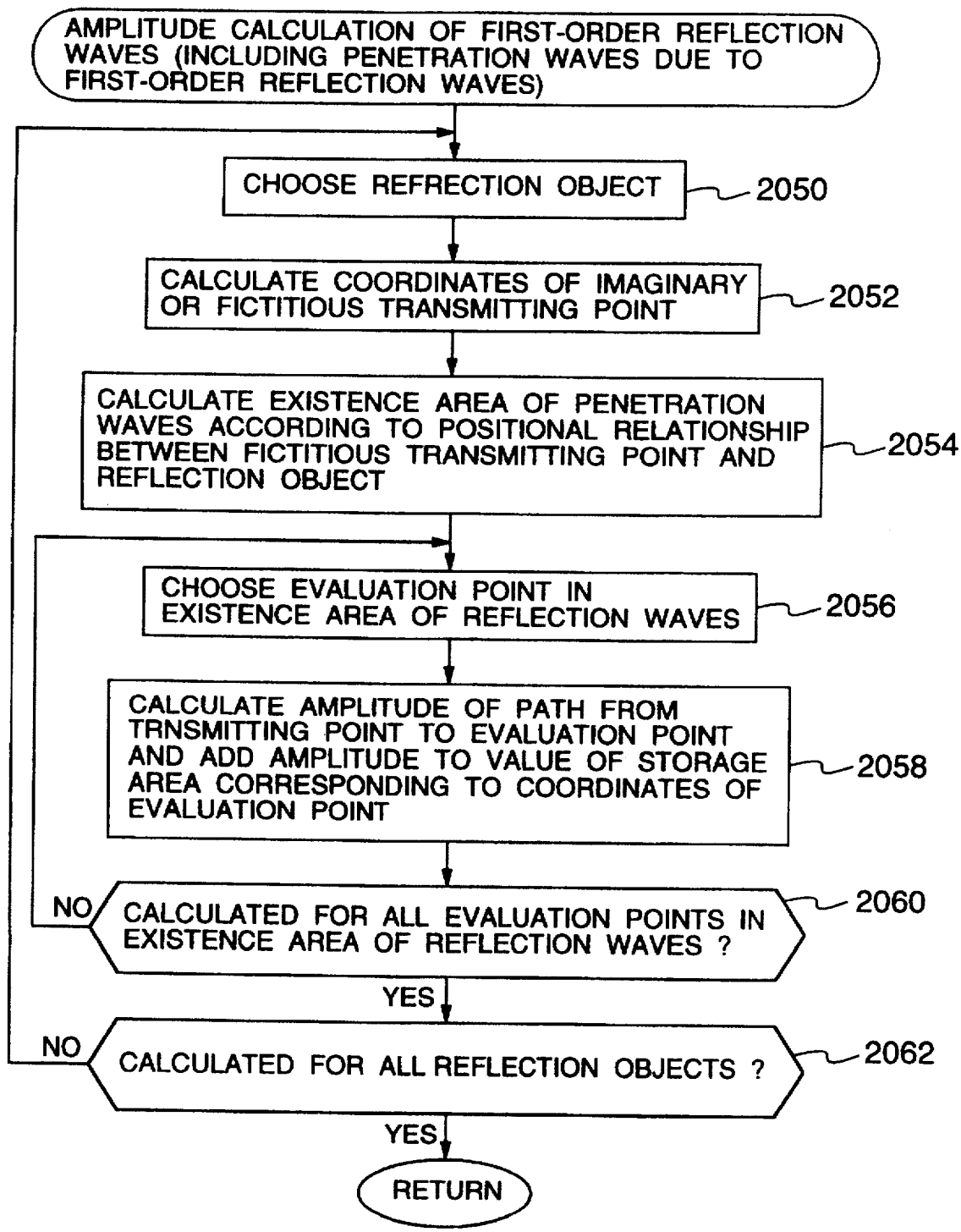
FIG. 10 is a flowchart showing a method of calculating intensity of first-order reflection waves (including penetration waves due to the first-order reflection waves) according to the present invention.
Figure 11:
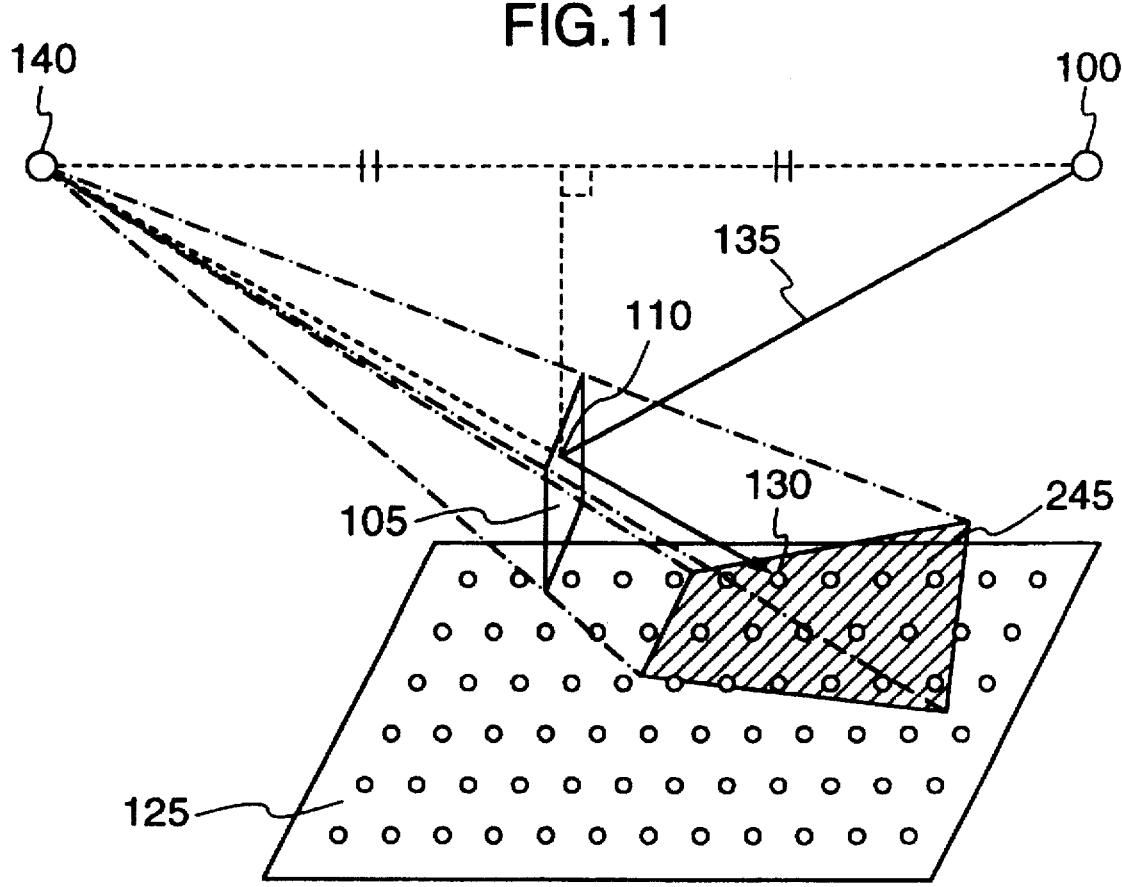
FIG. 11 is a perspective view showing an example of the objective area for the calculation of intensity of the first-order reflection waves according to the present invention.
Figure 12:
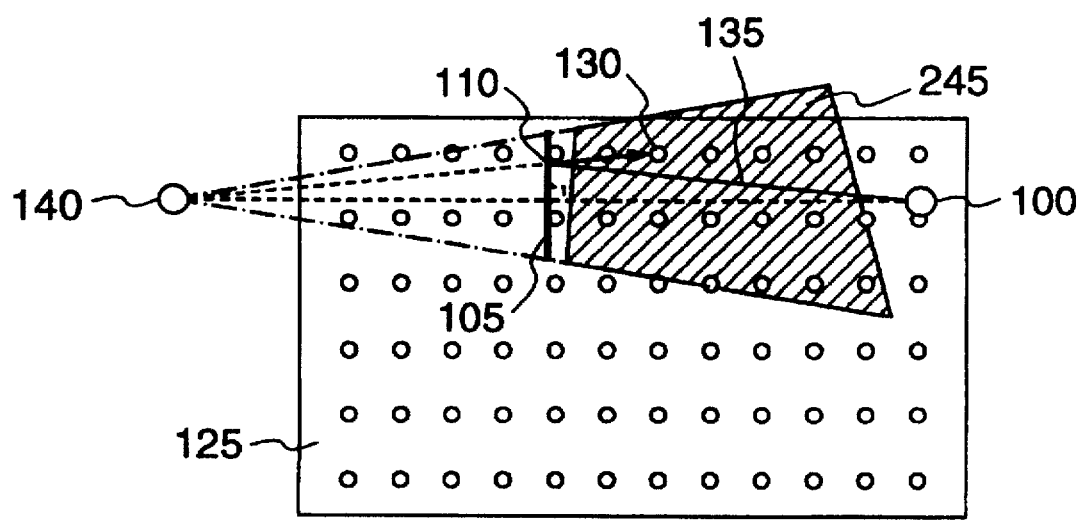
FIG. 12 is a plan view corresponding to the perspective view of FIG. 11.

FIG. 10 is a flowchart showing a method of calculating amplitude of first-order reflection waves. FIGS. 11 and 12 respectively are a perspective view and a plan view for explaining calculations of amplitude of first-order reflection waves according to the present invention.

In the amplitude calculation of first-order waves, one reflection object is first chosen (step 2050) to calculate a fictitious transmitting point for the reflection object according to the relationship of coordinates between the transmitting point and the reflection object (step 2052) so as to decide an existence area of the reflection waves according to the relationship of coordinates between the imaginary transmitting point and the reflection object (step 2054).

Subsequently, one evaluation point is selected in the particular area (step 2056). Since reflection waves from the pertinent reflection object arrive at the evaluation point, there exists a path from the transmitting point via the reflection object to the evaluation point. Calculation is conducted to obtain amplitude of reflection waves at the the evaluation point in this path and then the obtained amplitude value is added to the value of the storage area corresponding to the coordinates of the evaluation point (step 2058).

The amplitude calculation (step 2058) is repeatedly conducted for all evaluation points in the reflection wave existence area (step 2060). The above steps are repetitiously carried out for all reflection objects (step 2062). Specifically, as shown in FIGS. 11 and 12, one reflection object 105 is first chosen to calculate an imaging transmission point 140 on the basis of the coordinate relationship between the transmission point and the reflection object 105 so as to determine a existence area 245 of reflection waves according to the positional relationship between the fictitious transmission point 140 and the reflection object 105. Next, for each evaluation point 130, a path is calculated in the particular area 245 to obtain amplitude of received power (first-order reflection waves) in the path from the transmission point to the evaluation point. The amplitude is then accumulated to the value of amplitude kept in the storage area corresponding to the evaluation point.

Figure 1:
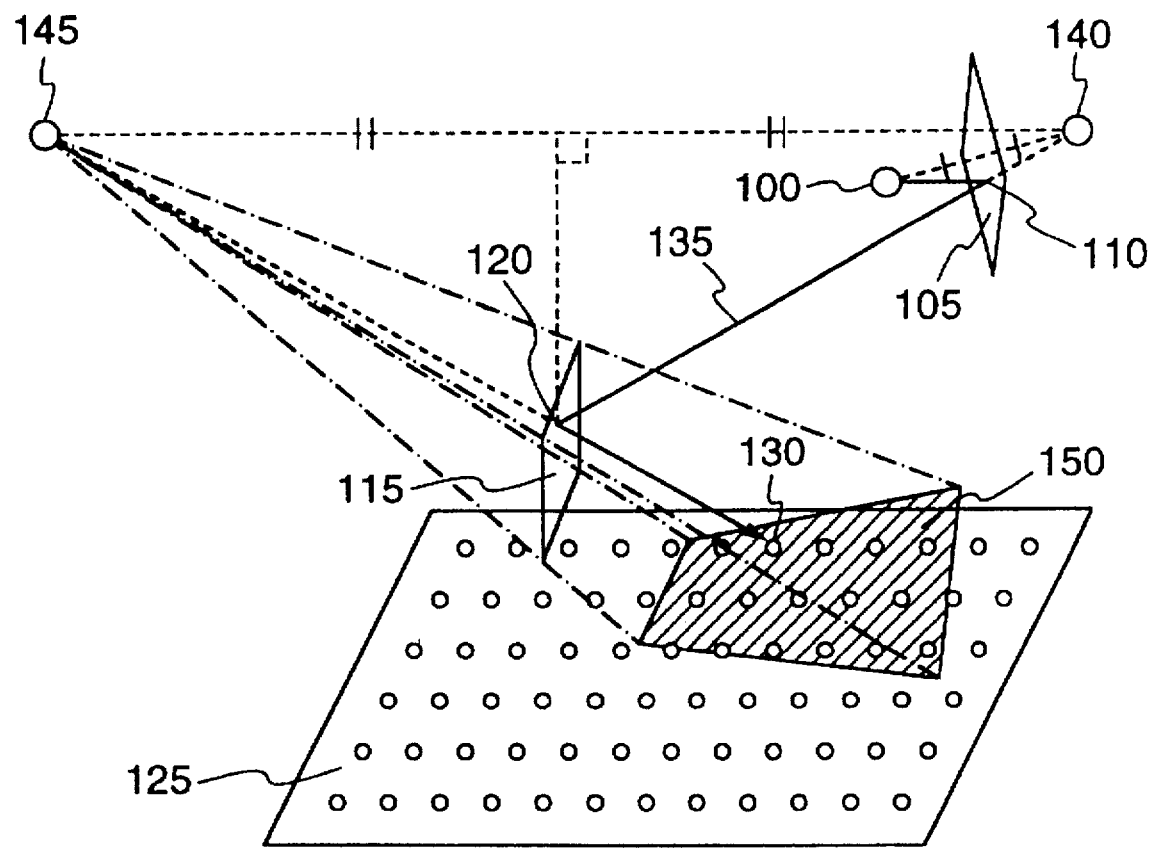
FIG. 1 is a perspective view showing a particular area when the received power calculation is conducted for second-order reflection waves according to the present invention.
Figure 3:
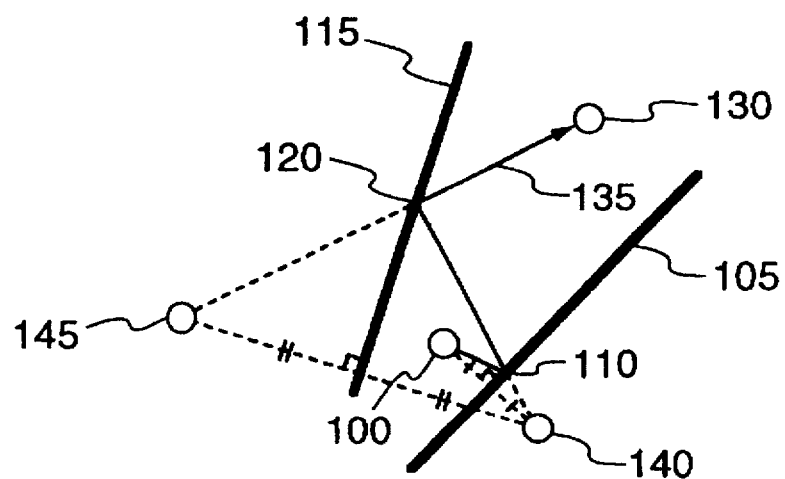
FIG. 3 is a diagram showing a procedure to obtain a path of electric waves.
Figure 2:
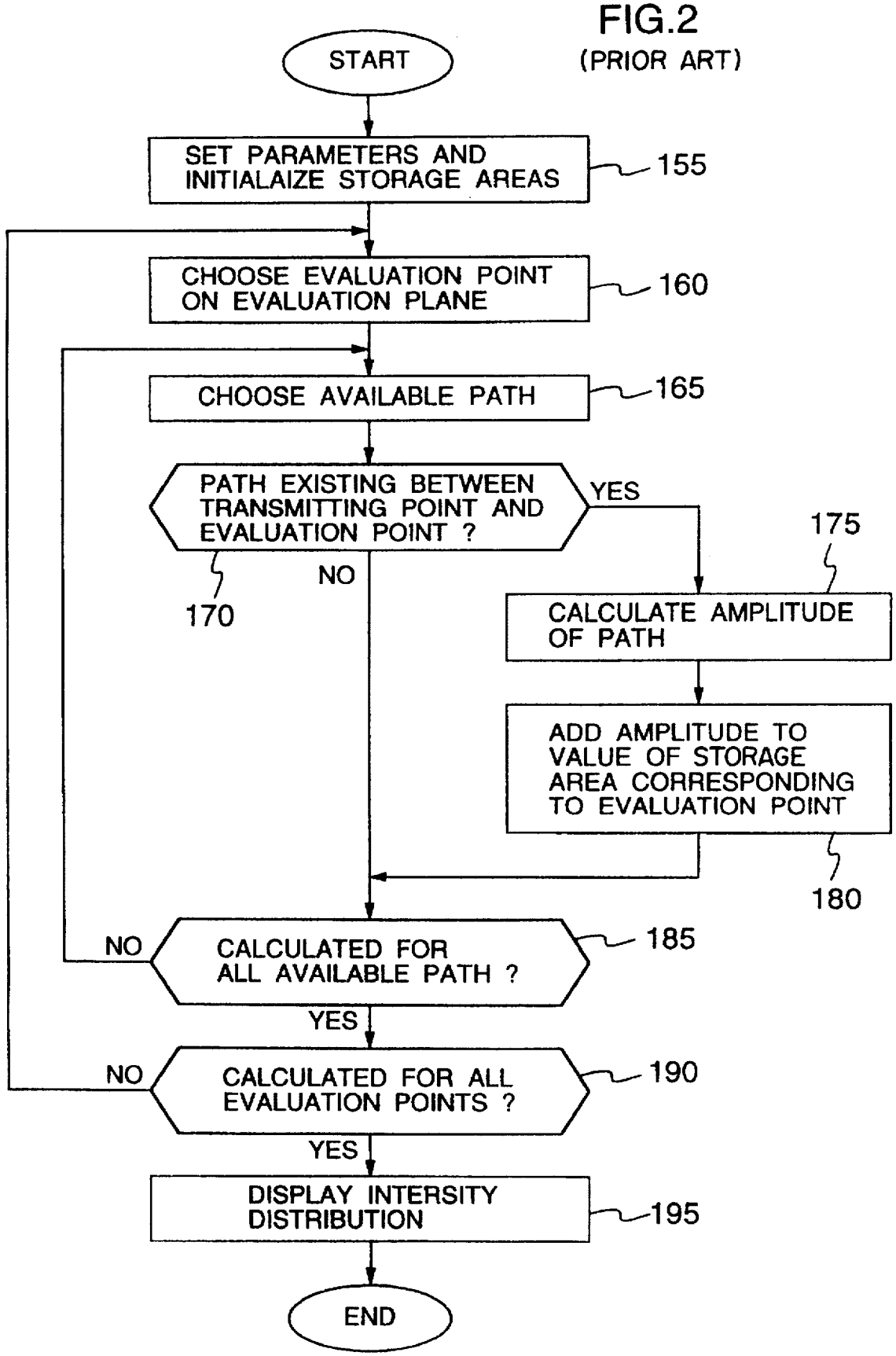
FIG. 2 is a flowchart showing a method of predicting the received power according to the prior art.
Figure 13:
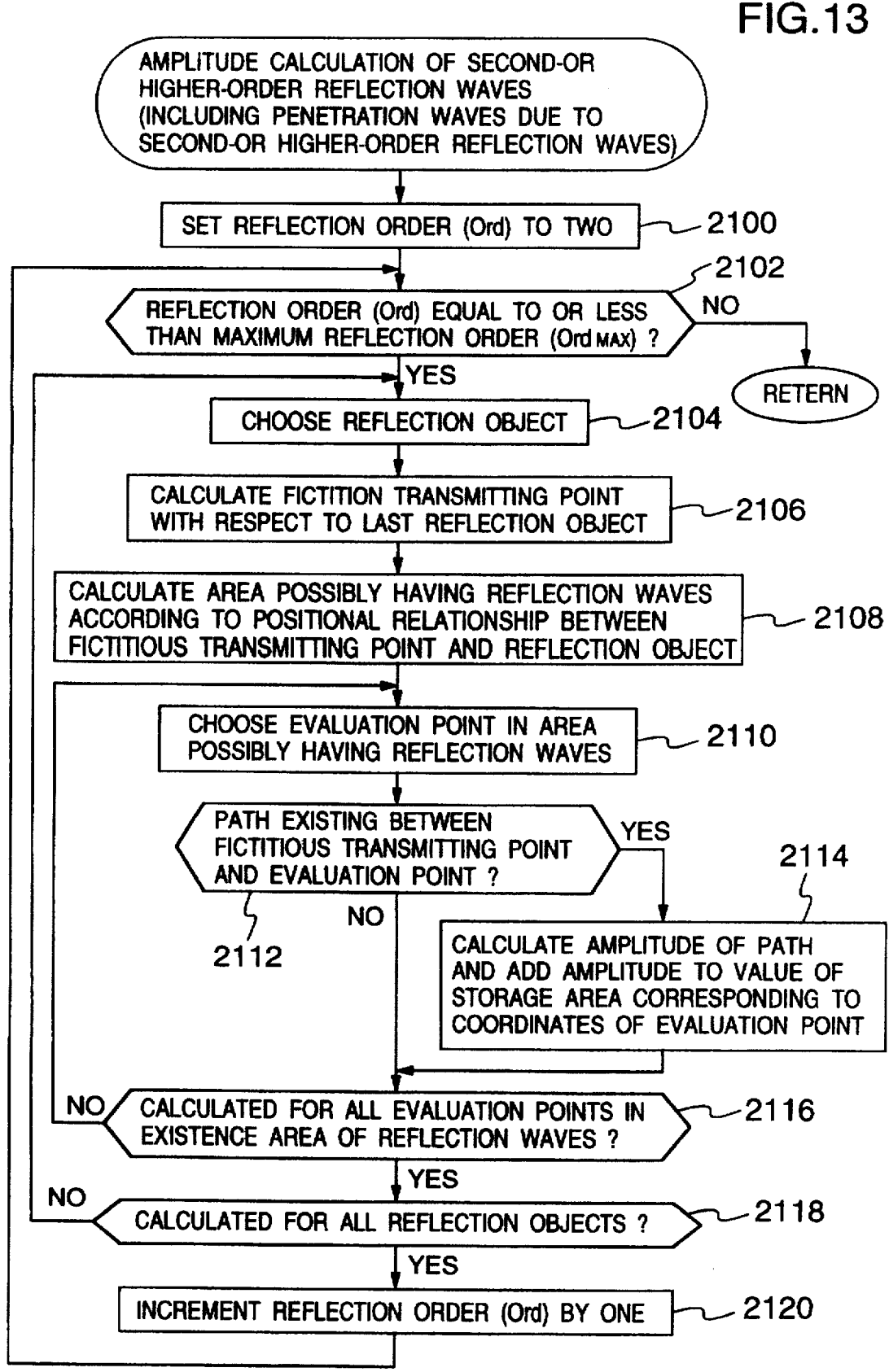
FIG. 13 is a flowchart showing a method of calculating intensity of second- and higher-order reflection waves (including penetration waves due to the second- and higher-order reflection waves) according to the present invention.
Figure 14:
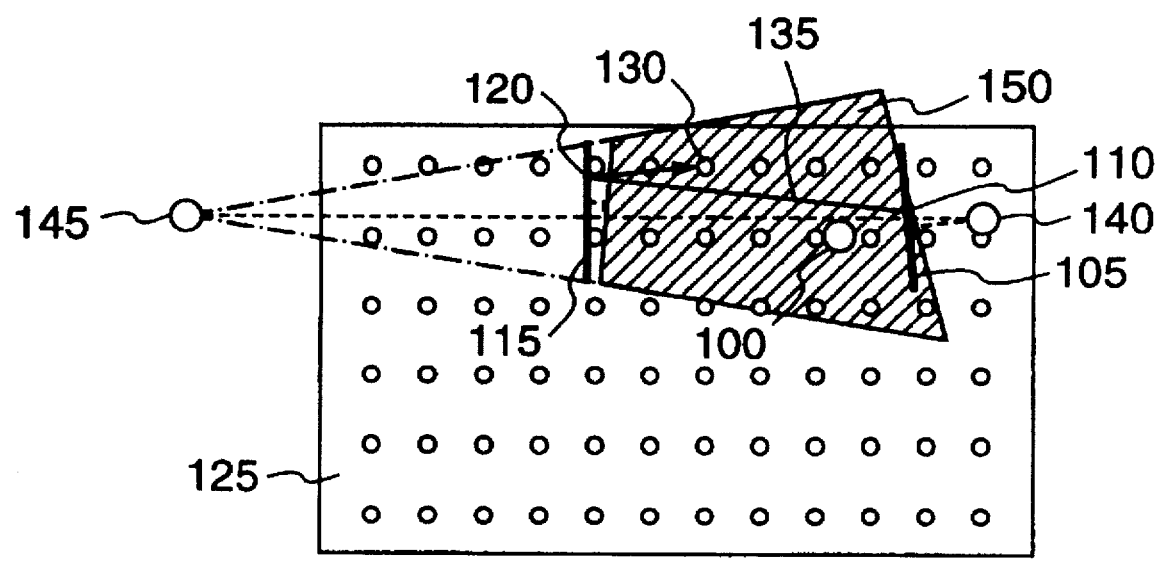
FIG. 14 is a plan view showing an example of the objective area for the calculation of intensity of the second- and higher-order reflection waves according to the present invention.

FIG. 13 is a flowchart showing a method of calculating amplitude of second- and higher-order waves. FIGS. 1 and 14 respectively are a perspective view and a plan view for explaining procedures of calculating amplitude of second- and higher-order waves according to the present invention.

In the calculation of amplitude of second- and higher-order waves, a value of two is first assigned to variable Ord indicating the reflection order to start the calculation beginning at second-order reflection waves (step 2100). When the reflection order Ord currently being used for calculation exceeds a predetermined reflection order, the calculation is terminated. Otherwise, control is transferred to step 2104 (step 2102).

One reflection object is first selected (step 2104) to calculate a fictitious transmitting point for the reflection object (step 2106). According to relationship of coordinates between a fictitious transmitting point associated with a reflection object by which reflection waves are last reflected and the reflection object, calculation is carried out to attain an area in which the reflection waves possibly exist (step 2108). For the evaluation point chosen in the obtained area (step 2110), there exists a chance in which the path is missing for the evaluation point. Consequently, a check is made for existence of the path (step 2112). If the path is present, amplitude is calculated for the path and is then added to the value of the storage area associated with the evaluation point (step 2114). The choice of the evaluation point in the reflection wave existence area (step 2110), path existence determination (step 2112), and amplitude calculation of the path (step 2114) are accomplished for all evaluation points in the area in which the reflection wave possibly exist (step 2116). The similar calculations are repetitiously carried out for the next reflection object (step 2118). Thereafter, the value of variable Ord indicating the reflection order is incremented by one (step 2120). The operation above is repeatedly effected up to the desired reflection order.

Referring now to FIGS. 1 and 14, description will be specifically given of the amplitude calculation for second- and higher-order reflection waves. Assume there exists a path 135 from a transmission point to an evaluation point in which electric waves are reflected by the first reflection object 105 and the second reflection object 115 in this sequence and are finally received by the evaluation point.

First, there is selected one of the paths reflecting waves from the first reflection object 105 to the second reflection object 115 (step 2104) to conduct calculations to obtain an imaging transmitting point 140 of the transmitting point with respect to the first reflection object 105 and then a fictitious transmitting point 145 of the imaging transmitting point 140 with respect to the second reflection object 115 (step 2106). According to the coordinate relationship between the second reflection object 115 by which the electric waves are last reflected and the fictitious transmitting point 145 for the second reflection object 115, calculation is carried out to decide a particular area 150 in which the reflection waves are possibly present (step 2108). One of the evaluation points 130 is then chosen in the particular region 150 (step 2110). Since it is not guaranteed that the reflection waves necessarily arrive at the evaluation point, a path existence check is conducted (step 2116). Amplitude of the path is then calculated to be added to the value of the storage area corresponding to the coordinates of the evaluation point (step 2114). These steps are repetitiously accomplished for all evaluation points in the area in which there is a chance of existence for the reflection waves.

Figure 15:
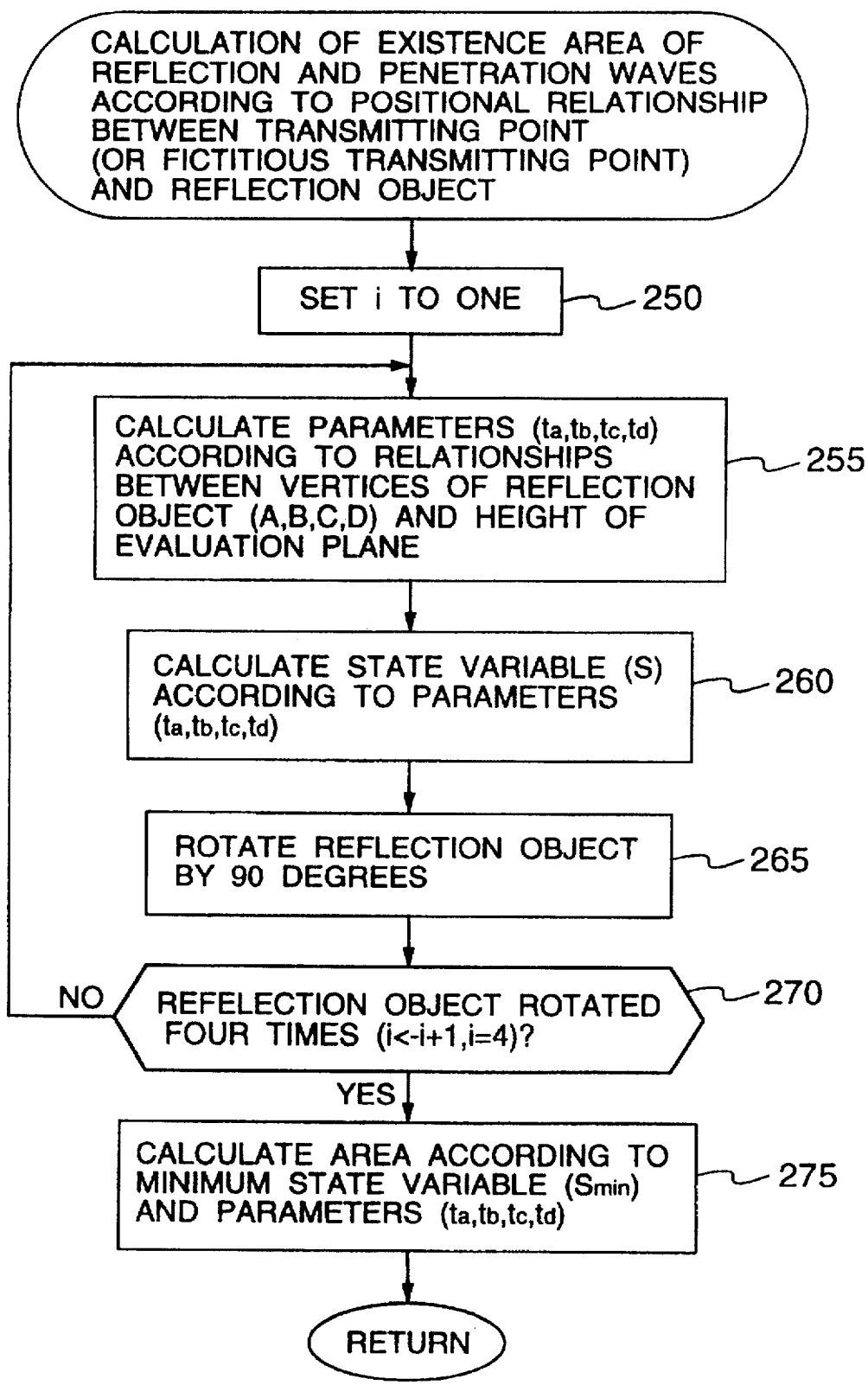
FIG. 15 is a flowchart showing a method of calculating existence areas of reflection or penetration waves on the basis of positional relationships between a transmitting point and reflection objects.

FIG. 15 is a flowchart for explaining procedures to implement the calculation of the penetration wave existence area according to the coordinate relationship between the transmission point and the reflection object (step 2002), calculation of the reflection wave existence area according to the coordinate relationship between the fictitious transmission point and the reflection object (step 2054), and calculation of the area in which there is a chance of existence for the reflection waves according to the coordinate relationship between the imaginary transmission point and the reflection object (step 2108).

First, variable i indicating the number of rotations for the coordinates of four points of the reflection object is initialized to one (step 250). Assume that the transmitting point or the virtual transmitting point is represented as $I(x_i, y_i, z_i)$. Using the coordinates of four points of the reflection object, i.e., $A(x_a, y_a, z_a)$, $B(x_b, y_b, z_b)$, $C(x_c, y_c, z_c)$, and $D(x_d, y_d, z_d)$ and the height h 2302 of the evaluation plane, parameters $t_a$, $t_b$, $t_c$, and $t_d$ are derived from expression (4) (step 255).

$$\begin{cases} t_a = \dfrac{h - z_i}{z_a - z_i} \\ t_b = \dfrac{h - z_i}{z_b - z_i} \\ t_c = \dfrac{h - z_i}{z_c - z_i} \\ t_d = \dfrac{h - z_i}{z_d - z_i} \end{cases} \quad (4)$$

Subsequently, the state variable is determined according to parameters $t_a$, $t_b$, $t_c$, and $t_d$.

Concretely, there are introduced work variables $S_a$, $S_b$, $S_c$, and $S_d$ corresponding to parameters $t_a$, $t_b$, $t_c$, and $t_d$. When $0 \leq t_a \leq 1$, $1 < t_a$, and $t_a < 0$, the value of work variable $S_a$ is set to 0, 1, and 2, respectively.

FIGS. 16A to 16C show coordinate relationships between the transmitting point or fictitious transmitting point, reflection objects, and evaluation plane as well as correspondences of work variables. In FIG. 16A, electric waves emitted from a transmission point or a virtual transmitting point I 295 propagates via a vertex A 300 of a reflection object to a point A' 320 on the evaluation plane. In this situation, work variable $S_a$ takes a value of zero. In FIG. 16B, electric waves emitted from the transmission point or imaging transmitting point I 295 arrive at the point A' 320 on the evaluation plane prior to the vertex A 300 of the reflection object. In this case, the value of work variable $S_a$ is one. In FIG. 16C, a line segment drawn from the transmission point or fictitious transmitting point I 295 to the vertex A 300 of the reflection object does not intersect the evaluation plane. On this occasion, work variable Sa is set to "2".

The conversion of parameter values is executed also for the other parameters ($t_b, t_c, t_d$) to determine the respective work variables ($S_b, S_c, S_d$). Using the obtained work variables ($S_a, S_b, S_c, S_d$), the value of state variable S is determined according to expression (5). As a result, the coordinates of the four points, values of the parameters, and state variable are stored in the system (step 260).

$$S = 3^3 S_a + 3^2 S_b + 3^1 S_c + 3^0 S_d \quad (5)$$

Thereafter, the coordinates of the four points of the reflection object are rotated (step 265). Namely, the vertices A 300, B 305, C 310, and D 315 of the reflection object are subjected to rotation as "A←B", "B←C", "C←D", and "D←A", respectively.

Subsequently, variable i representing the number of rotations thus effected is incremented by one (step 270). If the number of rotations is less than four, i.e., i<4, the process is repeatedly conducted beginning at step 255 for the calculation of parameters (step 270). There is selected a combination of work variables which leads to the minimum value ($S_{min}$) of state variable S. Resultantly, an area to be projected onto the evaluation plane is calculated according to the values respectively of vertices A to D of the reflection object, parameters ($t_a, t_b, t_c, t_d$), and state variable $S_{min}$ (step 275).

To determine a combination providing the minimum value of state variable S, the reflection object is rotated for the following reasons. For example, in FIGS. 17A and 17B, although the regions produced by the reflection objects are substantially equal to each other, the values of state variable S is "56" and "8" in FIGS. 17A and 17B, respectively. In this fashion, even when the areas generated by the reflection object are the same, the state variable varies depending to values of coordinates assigned to the pertinent points. In consequence, the reflection object is rotated to determine the values minimizing the state variable, thereby conducting the area calculation with the obtained values. For example, in the situation of FIG. 17A, the reflection object is rotated to the state shown in FIG. 17B such that the state variable is set to "8" in the area calculation.

Description will be next given in detail to the calculation of an area according to the minimum value of state variable (step 275).

Examining the combinations of coordinates representing relationships between the transmitting point or imaginary transmitting, point and reflection objects, it is recognized that the minimum value $S_{min}$ of state variable takes either one of the values "0", "4", "8", "40", "44", and "80".

FIG. 18 shows relationships between the transmitting point or imaginary transmitting point I 295, reflection object 105, evaluation plane 125, and area projected onto the evaluation plane 125 wherein four vertices of the area projected onto the evaluation plane 125 are $A'(x_a', h_a', h)$, $B'(x_b', y_b', h)$, $C'(x_c', y_c', h)$, and $D'(x_d', y_d', h)$.

Figure 19A:
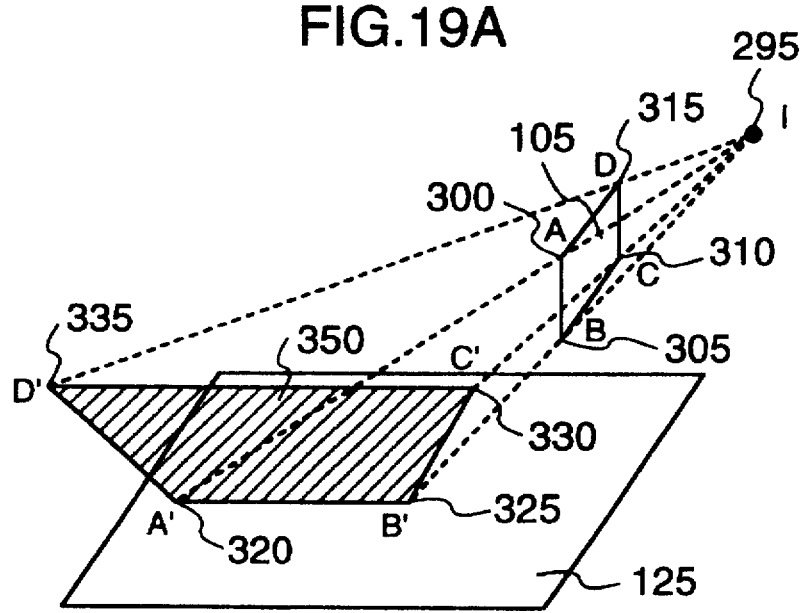
FIGS. 19A and 19B are diagrams showing existence area of reflection or penetration waves when the state variable takes a value of zero.
Figure 19B:
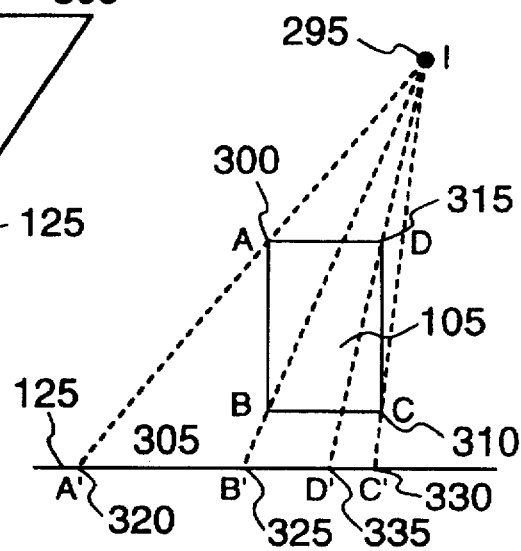

FIGS. 19A and 19B are diagrams for explaining the relationships when the minimum value of state variable (to be simply referred to as state variable herebelow) $S_{min}$ is "0".

FIGS. 19A and 19B, indicate a projection view and a side view, respectively. Points A' 320, B' 325, C' 330, and D' 335 projected onto the evaluation plane 125 are intersections between the evaluation plane and elongated portions of lines drawn from the transmitting point or imaginary transmitting point I 295 to the vertices A 300, B 305, C 310, and D 315 of the reflection object 105, respectively. Consequently, coordinates of the points A' 320, B' 325, C' 330, and D' 335 are represented by expression (6) as follows.

$$\begin{cases} A': \begin{pmatrix} x'_a \\ y'_a \\ h \end{pmatrix} = \begin{pmatrix} x_a - x_i \\ y_a - x_i \\ 0 \end{pmatrix} t_a + \begin{pmatrix} x_i \\ y_i \\ h \end{pmatrix} \\ B': \begin{pmatrix} x'_b \\ y'_b \\ h \end{pmatrix} = \begin{pmatrix} x_b - x_i \\ y_b - x_i \\ 0 \end{pmatrix} t_b + \begin{pmatrix} x_i \\ y_i \\ h \end{pmatrix} \\ C': \begin{pmatrix} x'_c \\ y'_c \\ h \end{pmatrix} = \begin{pmatrix} x_c - x_i \\ y_c - x_i \\ 0 \end{pmatrix} t_c + \begin{pmatrix} x_i \\ y_i \\ h \end{pmatrix} \\ D': \begin{pmatrix} x'_d \\ y'_d \\ h \end{pmatrix} = \begin{pmatrix} x_d - x_i \\ y_d - x_i \\ 0 \end{pmatrix} t_d + \begin{pmatrix} x_i \\ y_i \\ h \end{pmatrix} \end{cases} \quad (6)$$

Figure 20A:
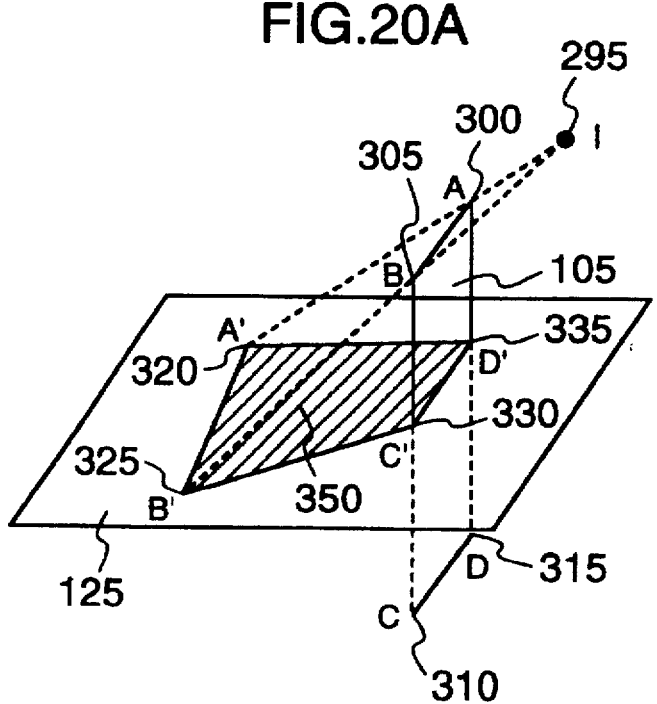
FIGS. 20A and 20B are diagrams showing existence area of reflection or penetration waves when the state variable takes a value of four.
Figure 20B:
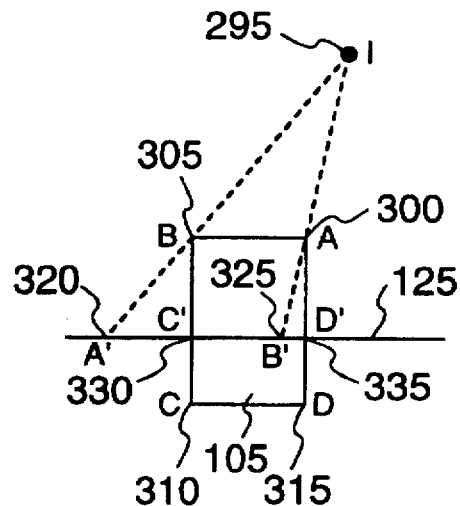

FIGS. 20A and 20B are diagrams for explaining the relationships when the minimum value of state variable $S_{min}$ takes a value of four.

FIGS. 20A and 20B, denote a projection view and a side view, respectively. Points A' 300 and B' 305 projected onto the evaluation plane 125 are crosspoints between the evaluation plane and extended portions of lines drawn from the transmitting point or imaginary transmitting point I 295 to the vertices A 300 and B 305 of the reflection object 105, respectively. Moreover, points C' 310 and D' 315 on the evaluation plane 125 are intersections between edge BC and the evaluation plane and between edge DA and the evaluation plane, respectively. In consequence, these points A' 320, B' 325, C' 330, and D' 335 are assigned with coordinates represented by expression (7) as follows.

$$\begin{cases} A': \begin{pmatrix} x'_a \\ y'_a \\ h \end{pmatrix} = \begin{pmatrix} x_a - x_i \\ y_a - x_i \\ 0 \end{pmatrix} t_a + \begin{pmatrix} x_i \\ y_i \\ h \end{pmatrix} \\ B': \begin{pmatrix} x'_b \\ y'_b \\ h \end{pmatrix} = \begin{pmatrix} x_b - x_i \\ y_b - x_i \\ 0 \end{pmatrix} t_b + \begin{pmatrix} x_i \\ y_i \\ h \end{pmatrix} \\ C': \begin{pmatrix} x'_c \\ y'_c \\ h \end{pmatrix} = \begin{pmatrix} x_c - x_i \\ y_c - x_i \\ 0 \end{pmatrix} t_c + \begin{pmatrix} x'_b \\ y'_b \\ h \end{pmatrix} ; t_c = \frac{h - z_b}{z_c - z_b} \\ D': \begin{pmatrix} x'_d \\ y'_d \\ h \end{pmatrix} = \begin{pmatrix} x_d - x_i \\ y_d - x_i \\ 0 \end{pmatrix} t_d + \begin{pmatrix} x'_d \\ y'_d \\ h \end{pmatrix} ; t_d = \frac{h - z_d}{z_a - z_d} \end{cases} \quad (7)$$

Figure 21A:
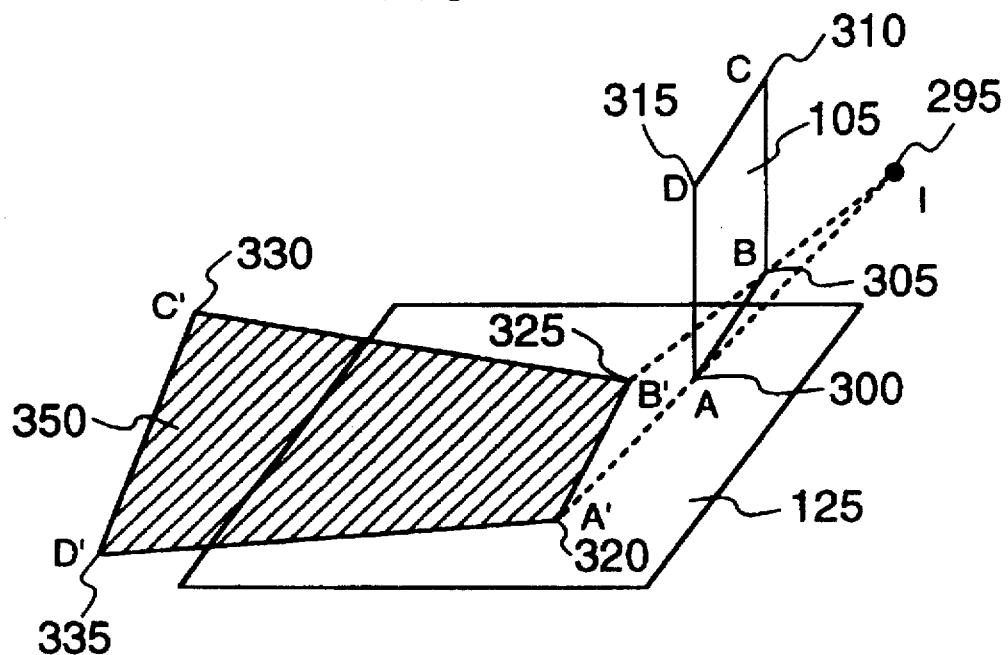
FIGS. 21A and 21B are diagrams showing existence area of reflection or penetration waves when the state variable takes a value of eight.
Figure 21B:
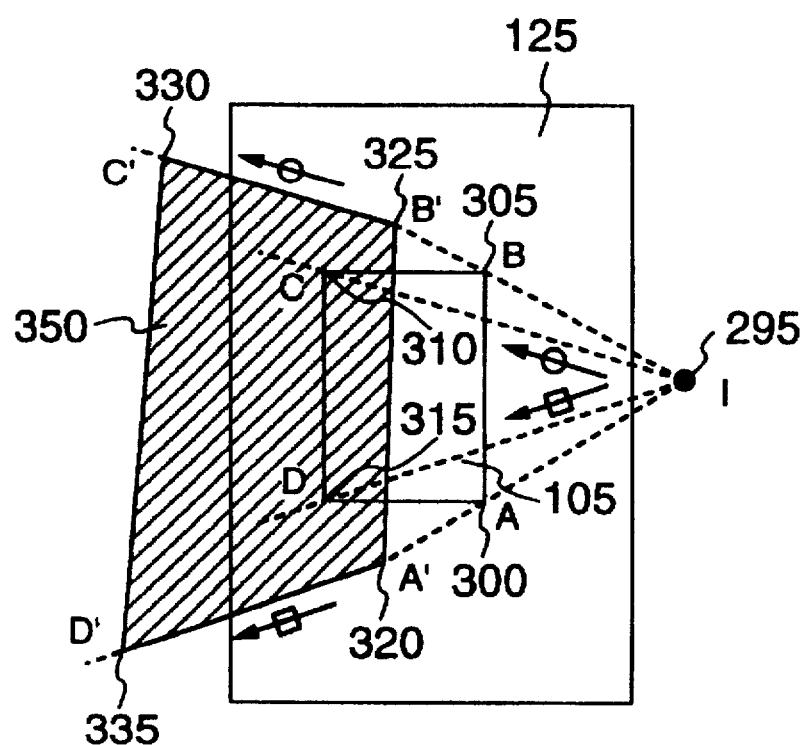

FIGS. 21A and 21B are diagrams for explaining the relationships when the minimum value of state variable $S_{min}$ is "8".

FIGS. 21A and 21B, represent a projection view and a side view, respectively. Points A' 320 and B' 325 projected onto the evaluation plane 125 are crosspoints between the evaluation plane 125 and extensions of lines drawn from the transmitting point or imaginary transmitting point I 295 to the vertices A 300 and B 305 of the reflection object 105, respectively. On the other hand, point C' 330 is a point at an infinite distance on a line extended from point B' 325 in a direction parallel to line segment IC. Similarly, point D' 335 is a point at an infinite distance on a line extended from point A' 320 in a direction parallel to line segment ID. Consequently, coordinates of these points are represented by expression (8) as follows.

$$\begin{cases} A': \begin{pmatrix} x'_a \\ y'_a \\ h \end{pmatrix} = \begin{pmatrix} x_a - x_i \\ y_a - x_i \\ 0 \end{pmatrix} t_a + \begin{pmatrix} x_i \\ y_i \\ h \end{pmatrix} \\ B': \begin{pmatrix} x'_b \\ y'_b \\ h \end{pmatrix} = \begin{pmatrix} x_b - x_i \\ y_b - x_i \\ 0 \end{pmatrix} t_b + \begin{pmatrix} x_i \\ y_i \\ h \end{pmatrix} \\ C': \begin{pmatrix} x'_c \\ y'_c \\ h \end{pmatrix} = \begin{pmatrix} x_c - x_i \\ y_c - x_i \\ 0 \end{pmatrix} t_\infty + \begin{pmatrix} x'_b \\ y'_b \\ h \end{pmatrix} \\ D': \begin{pmatrix} x'_d \\ y'_d \\ h \end{pmatrix} = \begin{pmatrix} x_d - x_i \\ y_d - x_i \\ 0 \end{pmatrix} t_\infty + \begin{pmatrix} x'_a \\ y'_a \\ h \end{pmatrix} \end{cases} \quad (8)$$

In expression (8), $t_\infty$ denotes a sufficiently large value, for example, $10^5$.

Figure 22A:
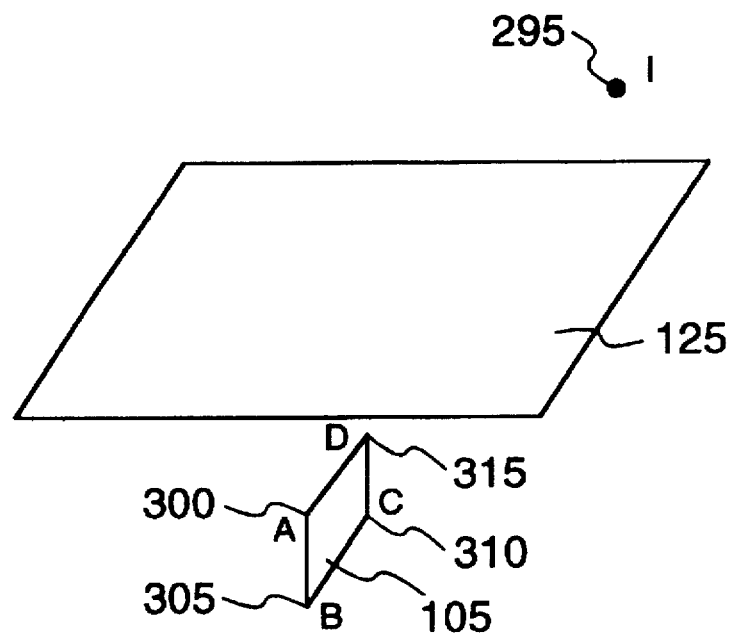
FIGS. 22A and 22B are diagrams showing existence area of reflection or penetration waves when the state variable take a value of 40.
Figure 22B:
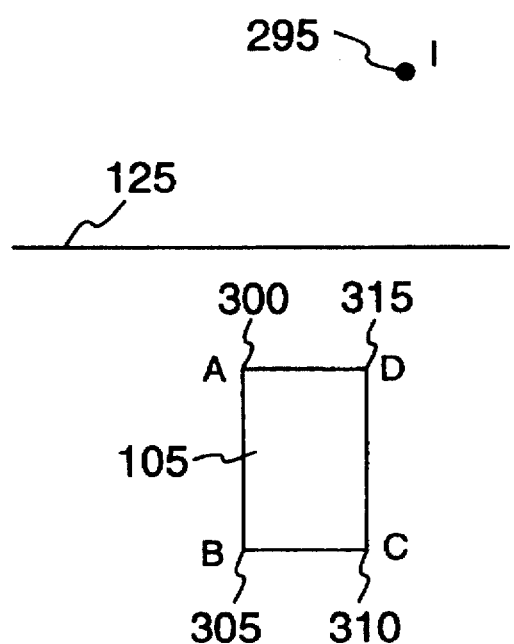

FIGS. 22A and 22B are diagrams for explaining the relationships above when state variable $S_{min}$ takes a minimum value of 40.

FIGS. 22A and 22B, designate a projection view and a side view, respectively. In this case, the objective area is missing on the evaluation plane 125.

Figure 23A:
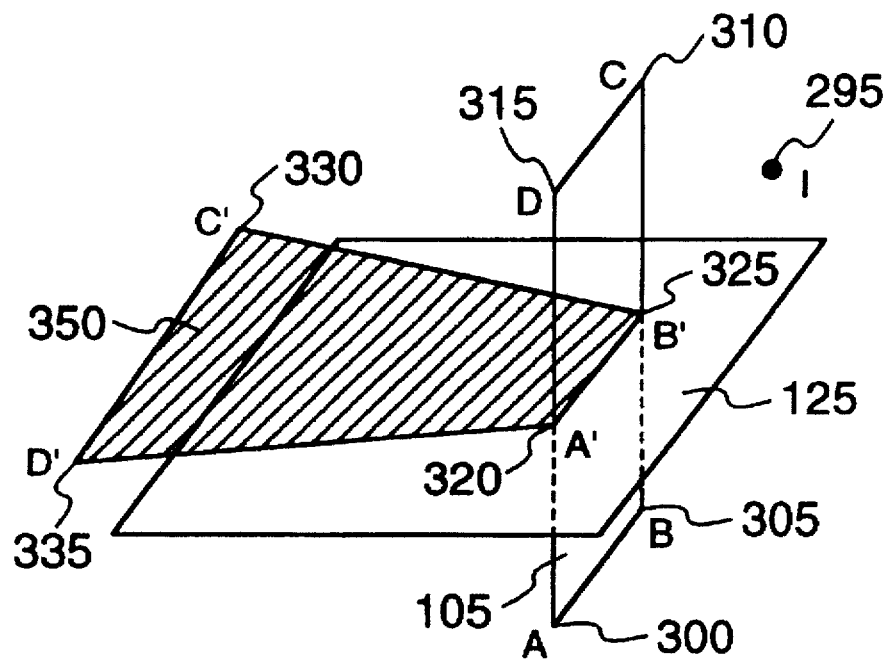
FIGS. 23A and 23B are diagrams showing existence area of reflection or penetration waves when the state variable takes a value of 44.
Figure 23B:
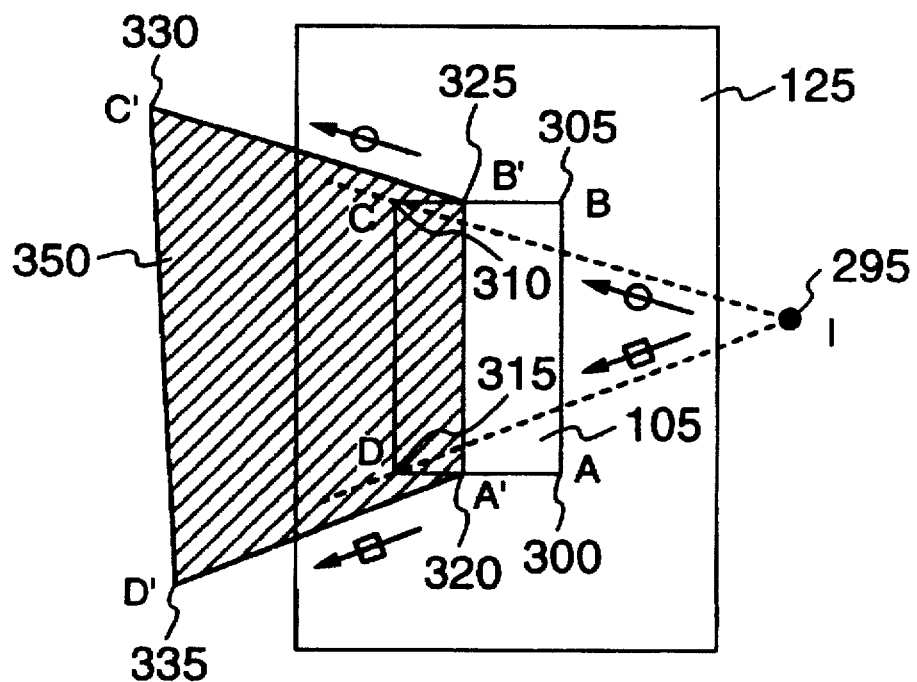

FIG. 23A and 23B are diagrams for explaining the relationships when the value of state variable $S_{min}$ is "44".

FIGS. 23A and 23B, represent a projection view and a side view, respectively. Point A' 320 projected onto the evaluation plane 125 is an intersection between edge BC and the plane 125, whereas point B' 325 is a crosspoint between edge DA and the evaluation plane 125. Moreover, point C' 330 is a point at an infinite distance on a line extended from point B' 325 in a direction parallel to line segment IC. Similarly, point D' 335 is a point at an infinite distance on a line extended from point A' 320 in a direction parallel to line segment ID. Therefore, these points have coordinates represented by expression (9) as follows.

$$\begin{cases} A': \begin{pmatrix} x'_a \\ y'_a \\ h \end{pmatrix} = \begin{pmatrix} x_a - x_d \\ y_a - x_d \\ 0 \end{pmatrix} t_a + \begin{pmatrix} x_d \\ y_d \\ h \end{pmatrix} ; t_a = \frac{h - z_d}{z_a - z_d} \\ B': \begin{pmatrix} x'_b \\ y'_b \\ h \end{pmatrix} = \begin{pmatrix} x_c - x_b \\ y_c - x_b \\ 0 \end{pmatrix} t_b + \begin{pmatrix} x_b \\ y_b \\ h \end{pmatrix} ; t_b = \frac{h - z_b}{z_c - z_b} \\ C': \begin{pmatrix} x'_c \\ y'_c \\ h \end{pmatrix} = \begin{pmatrix} x_c - x_i \\ y_c - x_i \\ 0 \end{pmatrix} t_\infty + \begin{pmatrix} x'_b \\ y'_b \\ h \end{pmatrix} \\ D': \begin{pmatrix} x'_d \\ y'_d \\ h \end{pmatrix} = \begin{pmatrix} x_d - x_i \\ y_d - x_i \\ 0 \end{pmatrix} t_\infty + \begin{pmatrix} x'_a \\ y'_a \\ h \end{pmatrix} \end{cases} \quad (9)$$

As in expression (8), $t_\infty$ designates a sufficiently large value, for example, $10^5$ also in expression (9).

Figure 24A:
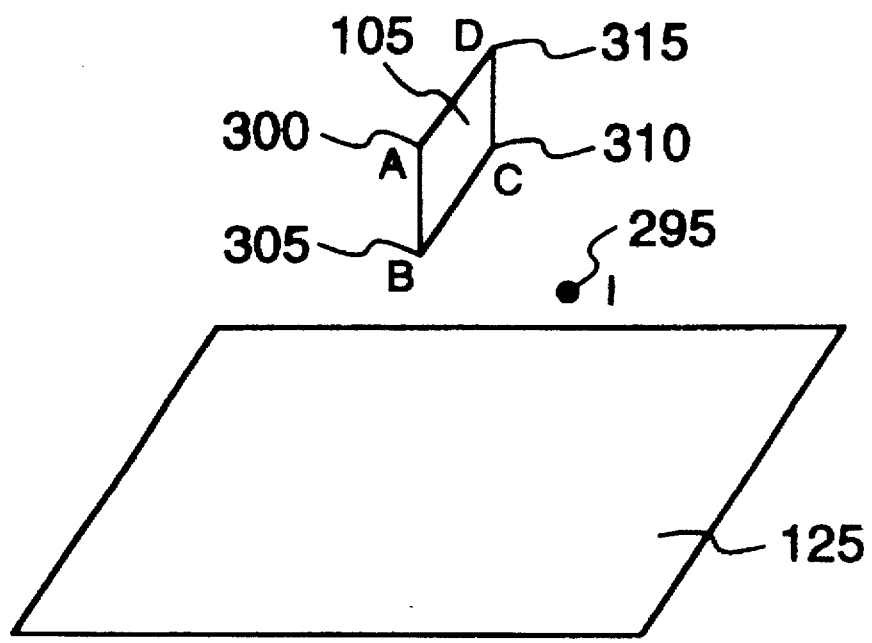
FIGS. 24A and 24B are diagrams showing existence area of reflection or penetration waves when the state variable takes a value of 80.
Figure 24B:
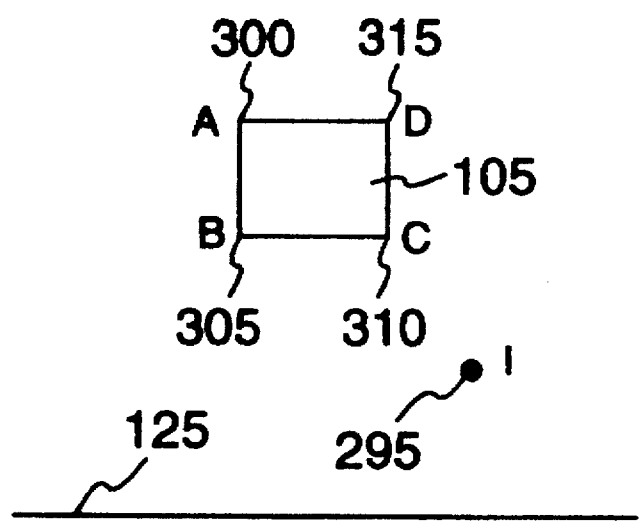

FIGS. 24A and 24B are diagrams for explaining the relationships when the value of state variable $S_{min}$ is "80".

FIGS 24A and 24B indicate a projection view and a side view, respectively. The projected area is missing on the evaluation plane 125 in this case.

Incidentally, for the program which implements the radio propagation simulation method, the calculation process of received power can be described in the language C++ (about 2500 coding lines).

According to the configuration of the present invention, in the prediction of received power including power of up to second-order reflection waves in a general placement of base stations, the period of time necessary for calculation can be reduced to about half that required in the conventional method. When the prediction is conducted for reflection waves up to third-order reflection waves, the calculation time can be minimized to about one sixth of that necessary in the prior art.

As can be seen from the description above, according to the present invention, the calculation for prediction of received power is accomplished only for the evaluation points contained in an area at which reflection or penetration waves arrive. Consequently, in the radio propagation simulation method utilizing the ray tracing method, the calculation time can be reduced while retaining the precision of calculation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A radio propagation simulation method of obtaining received power of electric waves emitted from a transmitting point at a point in a three-dimensional space including electric wave reflection objects at a plurality of evaluation points on a plane in the space, comprising:

a first step of obtaining at each of the plural evaluation points received power of electric waves received directly from the transmitting point or electric waves having penetrated through reflection objects; and a second step of deciding for each of the reflection objects a particular area at which reflection waves arrive, obtaining for each of the evaluation points contained in the particular area received power of reflection waves or reflection waves having penetrated through reflection objects, and adding the received power to that obtained in the first step.

2. A radio propagation simulation method according to claim 1, wherein the first step includes:

a step of attaining for each of the evaluation points received power of electric waves directly received from the transmitting point; and a step of deciding for each of the reflection objects an arrival area of penetration waves having passed through the reflection object, calculating penetration loss of electric waves for the evaluation point in the particular area, and correcting the received power of direct waves beforehand obtained for each of the evaluation points.

3. A radio propagation simulation method according to claim 2, wherein the arrival area of penetration waves is obtained according to coordinate relationships between the transmitting point and the reflection objects.

4. A radio propagation simulation method according to claim 1, wherein the second step includes deciding for each of the reflection objects an arrival area of first-order reflection waves, calculating a path of first-order reflection waves for each of the evaluation points contained in the particular area, calculating reflection loss for each path or penetration loss due to reflection objects on the path, and thereby obtaining received power of the reflection waves.

5. A radio propagation simulation method according to claim 4, wherein the second step includes deciding for each of the reflection objects an arrival area of second- and higher-order reflection waves, deciding presence or absence of a path of the reflection waves for each of the evaluation points contained in the particular area, calculating, when the path is present, reflection loss for each path or penetration loss due to reflection objects on the path, and thereby obtaining received power of the reflection waves.

6. A radio propagation simulation method according to claim 5, wherein the arrival area of reflection waves for each of the reflection objects is calculated according to a coordinate relationship between a position of a reflection object by which the reflection waves are last reflected and a fictitious transmitting point obtained for the reflection object.

7. A radio propagation simulation method according to claim 1, wherein the second step includes deciding for each of the reflection objects an arrival area of second- and higher-order reflection waves, deciding presence or absence of a path of the reflection waves for each of the evaluation points contained in the particular area, calculating, when the path is present, reflection loss for each path or penetration loss due to reflection objects on the path, and thereby obtaining received power of the reflection waves.

8. A radio propagation simulation method according to claim 7, wherein the arrival area of reflection waves for each of the reflection objects is calculated according to a coordinate relationship between a position of a reflection object by which the reflection waves are last reflected and a fictitious transmitting point obtained for the reflection object.

9. A radio propagation simulation method according to claim 1, wherein the arrival area of reflection waves for each of the reflection objects is calculated according to a coordinate relationship between a position of a reflection object by which the reflection waves are last reflected and a fictitious transmitting point obtained for the reflection object.

10. A radio propagation simulation method of obtaining received power of electric waves emitted from a transmitting point at a point in a three-dimensional space including a plurality of electric wave reflection objects at a plurality of evaluation points on an evaluation plane in the three-dimensional space, comprising:

a first step of setting parameters of the transmitting point, reflection objects, and evaluation plane and initializing storage areas for keeping therein values of amplitude respectively at the evaluation points;

a second step of calculating for the evaluation points values of amplitude thereat of electric waves directly from the transmitting point or electric waves having penetrated through at least one of the reflection objects, thereby keeping the values of amplitude respectively in the storage areas;

a third step of deciding for each of the reflection objects a particular area at which reflection waves arrive, and obtaining for each of the evaluation points contained in at least one of the particular areas a value of amplitude thereat of reflection waves directly from the reflection object or reflection waves having penetrated through at least one of the other reflection objects, thereby adding the value of amplitude to a value of amplitude kept in the storage area associated therewith; and a fourth step of outputting distribution of received power on the evaluation plane according to the values of amplitude kept in the storage areas.

11. A radio propagation simulation method according to claim 10, wherein the second step includes:

a step of choosing one of the plural reflection objects and determining, according to a coordinate relationship between the transmitting point and the chosen reflection object, an arrival area at which penetration waves having passed the reflection object arrive;

a step of deciding arrival areas of the penetration waves for all reflection objects;

a step of choosing one of the plural evaluation points on the evaluation plane, calculating a value of amplitude of waves thereat according to distance between the transmitting point and the chosen evaluation point, and recording the value of amplitude in the storage area corresponding to the evaluation point;

a step of deciding presence or absence of an arrival area which contains the chosen evaluation point and at which the penetration waves arrive, deciding a reflection object corresponding to the arrival area which contains the chosen evaluation point and at which the penetration waves arrive, multiplying the recorded value of amplitude by a penetration coefficient of the decided reflection object and thereby producing a value of amplitude when there exists the arrival area which contains the chosen evaluation point and at which the penetration waves arrive, and recording again the value of amplitude in the storage area corresponding to the chosen evaluation point; and a step of recording and keeping for the evaluation points, the associated values of amplitude in the storage areas respectively corresponding to the evaluation points.

12. A radio propagation simulation method according to claim 11, wherein:

the third step includes a fifth step of obtaining a value of amplitude at each of the evaluation points for first-order reflection waves and a sixth step of obtaining a value of amplitude at each of the evaluation points for second- and higher-order reflection waves;

the fifth step includes a step of choosing one of the plural reflection objects, deciding a fictitious transmitting point for the chosen reflection object, and determining an existence area of first-order reflection waves according to a coordinate relationship between the fictitious transmitting point and the reflection object, a step of calculating, for all evaluation points contained in the existence area of first-order reflection waves, values of amplitudes of first-order reflection waves respectively at the evaluation points, and a step of calculating values of amplitudes of first-order reflection waves for all reflection objects; and the sixth step includes a step of setting a value of reflection order n (n≧2);

a step of setting one of the combinations of n reflection objects, deciding a fictitious transmitting point for one of the reflection objects by which the reflection waves are last reflected, and determining, according to a coordinate relationship between the fictitious transmitting point and the reflection object of the last reflection, an area in which reflection waves of n-th order possibly exist, a step of calculating, for each of the evaluation points which are contained in the area possibly receiving reflection waves of n-th order possibly and for which a path exists to the transmitting point, a value of amplitude of reflection waves of n-th order at the evaluation point, a step of calculating the value of amplitude of reflection waves of n-th order for all combinations of n reflection objects, and setting again the reflection order n to a value equal to or less than a predetermined value of reflection order.

* * * * *